United States Patent
Ihle et al.

(10) Patent No.: US 8,792,508 B2
(45) Date of Patent: Jul. 29, 2014

(54) SUBSCRIBER AND COMMUNICATION CONTROLLER OF A COMMUNICATION SYSTEM AND METHOD FOR IMPLEMENTING A GATEWAY FUNCTIONALITY IN A SUBSCRIBER OF A COMMUNICATION SYSTEM

(75) Inventors: Markus Ihle, Jettenburg (DE); Tobias Lorenz, Schwieberdingen (DE); Jan Taube, Markgröningen (DE)

(73) Assignee: Robert Bosch GmbH, Stuttgart (DE)

( * ) Notice: Subject to any disclaimer, the term of this patent is extended or adjusted under 35 U.S.C. 154(b) by 1481 days.

(21) Appl. No.: 11/992,914

(22) PCT Filed: Oct. 4, 2006

(86) PCT No.: PCT/EP2006/067029
§ 371 (c)(1),
(2), (4) Date: Aug. 17, 2009

(87) PCT Pub. No.: WO2007/039622
PCT Pub. Date: Apr. 12, 2007

(65) Prior Publication Data
US 2009/0323708 A1    Dec. 31, 2009

(30) Foreign Application Priority Data
Oct. 6, 2005 (DE) .......................... 10 2005 048 585

(51) Int. Cl.
*H04L 12/56* (2006.01)
*G06F 13/14* (2006.01)
(52) U.S. Cl.
USPC .......................................... 370/402; 710/305
(58) Field of Classification Search
USPC ................... 370/402, 428, 474; 710/107, 305
See application file for complete search history.

(56) References Cited

U.S. PATENT DOCUMENTS

2003/0093727 A1 * 5/2003 Belschner et al. .............. 714/56
2004/0146051 A1 * 7/2004 Fuehrer ......................... 370/375
(Continued)

FOREIGN PATENT DOCUMENTS

| DE | 10 2005 034 744 | 7/2005 |
| EP | 1 574 965 | 9/2005 |
| JP | 62-181552 | 8/1987 |
| JP | 6-290127 | 10/1994 |

OTHER PUBLICATIONS

Eric Armengaud, "A Monitoring Concept for an Automotive Distributed Network—the FlexRay Example," 2004, Proceedings of the 7th Workshop on Design and Diognostics of Electonic Circuits and Systems, p. 173-178.*

(Continued)

*Primary Examiner* — Dang Ton
*Assistant Examiner* — Ryan Kavleski
(74) *Attorney, Agent, or Firm* — Kenyon & Kenyon LLP

(57) ABSTRACT

A subscriber of a communication system includes a microprocessor, at least two communication controllers and a peripheral bus. The microprocessor is connected to the communication controllers via the peripheral bus and is also connected via the communication controllers respectively to a communication link of the communication system, via which messages are transmitted. In order to optimize the gateway functionality within the subscriber, a provision is made that at least one of the communication controllers has an active interface via which the communication controller is connected to the peripheral bus and has a logic circuit for independently implementing a gateway functionality.

23 Claims, 15 Drawing Sheets

(56) References Cited

U.S. PATENT DOCUMENTS

| | | | |
|---|---|---|---|
| 2005/0284316 A1* | 12/2005 | Rugamer | 101/216 |
| 2006/0106966 A1* | 5/2006 | Joos et al. | 710/305 |
| 2006/0120389 A1* | 6/2006 | Sampath et al. | 370/401 |
| 2008/0077382 A1* | 3/2008 | Strehl | 703/20 |
| 2009/0323708 A1 | 12/2009 | Ihle et al. | |
| 2010/0260176 A1* | 10/2010 | Hartwich | 370/389 |

OTHER PUBLICATIONS

Ralph Belschner et al.: "FlexRay Requirements Specification" Internet Citation, [Online] May 16, 2002.

Dielissen, J. et al.: "Concepts and Implementation of the Philips Network-on-Chip" Internet Citation, [Online] Nov. 13, 2003.

\* cited by examiner

SUBSCRIBER AND COMMUNICATION CONTROLLER OF A COMMUNICATION SYSTEM AND METHOD FOR IMPLEMENTING A GATEWAY FUNCTIONALITY IN A SUBSCRIBER OF A COMMUNICATION SYSTEM

BACKGROUND OF THE INVENTION

1. Field of the Invention

The present invention relates to a subscriber (so-called host) of a communication system. The subscriber has a microprocessor, at least two communication controllers and a peripheral bus. The microprocessor is connected to the communication controllers via the peripheral bus and is connected via the communication controllers to each communication link of the communication system over which messages are transmitted.

The present invention also relates to a communication controller (CC) of the subscriber (so-called host) of a communication system. The subscriber has a microprocessor, the communication controller, optionally other communication controllers and a peripheral bus. The communication controller is in turn connected to the microprocessor via the peripheral bus and is also connected to a communication link of the communication system over which messages are transmitted.

Finally, the present invention also relates to a method for implementing a gateway functionality within a subscriber (so-called host) of a communication system. The subscriber has a microprocessor, at least two communication controllers and a peripheral bus. The communication controllers are connected on the one hand to the microprocessor via the peripheral bus and on the other hand each is connected to a communication link of the communication system over which messages are transmitted.

2. Description of Related Art

Networking of control units, sensors and actuators with the help of a communication system and a communication link designed as a bus system has increased drastically in recent years in modern vehicles as well as in mechanical engineering, in particular in the machine tool area and in the area of automation. Synergistic effects due to the distribution of functions to a plurality of control units may then be achieved. One speaks here of distributed systems. Communication among various subscribers takes place increasingly via a communication system designed as a bus system. Communication traffic on the bus system, access and receiving mechanisms as well as error processing are regulated via a protocol.

The FlexRay protocol is a known protocol for this purpose and is currently based on the FlexRay protocol specification v2.0. The FlexRay protocol defines a rapid deterministic and error-tolerant bus system, in particular for use in a motor vehicle. Data transmission according to the FlexRay protocol takes place according to a time division multiple access (TDMA) method. Data transmission via the communication link takes place in regularly recurring transmission cycles, each being subdivided into multiple data frames, also known as time slots. Fixed time slots in which the subscribers have exclusive access to the communication link are assigned to the subscribers and/or to the messages to be transmitted. The time slots are repeated in the defined transmission cycles, so the point in time at which a message is transmitted over the bus may be predicted accurately in advance and bus access is provided deterministically.

To optimally utilize the bandwidth for the message transmission on the bus system, FlexRay divides the transmission cycle, also referred to as cycle or bus cycle, into a static part and a dynamic part. The fixed time slots are in the static part at the beginning of a bus cycle. In the dynamic part the time slots are issued dynamically. Exclusive bus access therein is then made possible for only a short period of time, for one or more so-called minislots. Only if bus access takes place within a minislot is the time slot lengthened by the required time. Bandwidth is thus used only when actually needed.

FlexRay communicates via two physically separate lines of the communication link at a data rate of max. 10 Mbit/s each (10 Mbaud). A bus cycle is completed every 5 ms, or even every 1 ms or 2.5 ms with many communication systems. The two channels correspond to the physical layer, in particular in the OSI (open system architecture) layer model. The two channels are mainly for redundant and therefore error-tolerant transmission of messages but may also transmit different messages, which would then double the data rate. However, FlexRay may also be operated at lower data rates.

To implement synchronous functions and to optimize the bandwidth through small intervals between two messages, the subscribers, i.e., the distributed components in the communication network, require a common time base, the so-called global time. For clock synchronization, synchronization messages are transmitted in the static part of the cycle, local clock time of a subscriber being corrected with the help of a special algorithm in accordance with the FlexRay specification, so that all local clocks run synchronized with a global clock.

A FlexRay subscriber, which may also be referred to as a FlexRay network node or host, contains a subscriber processor or a host processor, a FlexRay controller or communication controller and, in the case of bus monitoring, a so-called bus guardian. The subscriber processor then supplies and processes all the data transmitted over the FlexRay communication controller and the FlexRay communication link. For communication in a FlexRay network, messages and/or message objects having up to 254 data bytes, for example, may be configured.

For coupling a FlexRay communication link over which messages are transmitted to a FlexRay subscriber, German patent application document DE 10 2005 034 744, describes the use of a FlexRay communication module which is connected via a subscriber interface to the subscriber and via another link to the communication link. For transmission of messages between the subscriber and the communication link, a structure for saving the messages is provided in the communication module. The transmission is controlled by a state machine. The FlexRay communication module may be an integral component of the FlexRay communication controller or may be designed as a separate component.

An interface module composed of two parts is provided in the communication module, one submodule being independent of the subscriber and the other submodule being subscriber-specific. The subscriber-specific or customer-specific submodule, also known as a customer CPU interface (CIF), connects a customer-specific subscriber in the form of a subscriber-specific host CPU to the FlexRay communication module. The subscriber-independent submodule, also known as the generic CPU interface (GIF), is a generic, i.e., general CPU interface over which different customer-specific host CPUs may be connected to the FlexRay communication module via appropriate subscriber-specific submodules, i.e., customer CPU interfaces (CIFs). This allows problem-free adaptation of the communication module to different subscribers because, depending on the subscriber, only the subscriber-specific submodule need be varied, whereas the subscriber-independent submodule and the rest of the communication module may always be designed the same. Thus, with the help of the communication module, a standard interface is obtained for connecting any FlexRay subscribers to a FlexRay communication link, such that the interface may be flexibly adapted to subscribers of any type or design by simply varying the subscriber-specific submodule. The submodules may also be implemented in software within the one interface module, i.e., each submodule as a software function.

The state machine in the FlexRay communication module may be hard-wired in the hardware. Alternatively, the state machine in the communication module may also be freely programmable by the subscriber via the subscriber interface.

According to the related art, the message memory in the FlexRay communication module is preferably embodied as a single-ported RAM (random access memory). This RAM memory saves the messages or message objects, i.e., the actual useful data together with configuration data and status data. The precise structure of the message memory in the known communication module is described in the German patent application document DE 10 2005 034 744 which was cited above.

According to the related art, within the subscriber the microcontroller, which includes the microprocessor (so-called host CPU), a memory (e.g., random access memory RAM) and a core bus between the microprocessor and the memory, is connected to the peripheral bus as the so-called master via a passive interface and an active interface. The microcontroller is only able to receive commands and data from other subscribers of the peripheral bus via the passive interface. Via the active interface the microcontroller itself may send data and commands to other subscribers of the peripheral bus. Connection of a subscriber to the peripheral bus via a passive interface is equivalent to connecting the subscriber as a so-called slave. A connection of a subscriber via an active interface corresponds to a connection of the subscriber as a so-called master. In a known communication system, a communication controller is connected as a so-called slave to the peripheral bus via a passive interface.

The communication controllers establish the connection of the subscriber to one or more communication links (e.g., CAN, TTCAN, MOST, FlexRay, ByteFlight, etc.). Each has a message memory in which messages newly received from the communication link are stored and messages to be sent on the communication link are read out. The microprocessor (host CPU) may access the saved message objects via the passive interface of the communication controller.

The microprocessor configures, monitors and controls the communication controller. The microprocessor reads out received messages, evaluates them, calculates new messages and ensures the writing of the messages for sending over the communication link. For data transmission within the subscriber, the microprocessor transmits data word by word out of the communication controller into the memory of the microcontroller. At the high clock rates of the microprocessor customary today, multiple waiting cycles occur during which the microprocessor waits for the end of the data transmission and is unable to pursue any other tasks.

In simple gateway operations, it is often necessary only to read out the received data from a communication controller of the subscriber and to write it to one or more other communication controllers of the subscriber for sending. If no DMA (direct memory access) controller is used, the microprocessor (the host CPU) transfers data word by word out of the communication controllers into a memory element assigned to the microprocessor or into a memory element internal to the CPU to process it, if necessary, and then copy it to the appropriate communication controller. At the high clock rates of the microprocessor (the host CPU) customary today, several waiting cycles occur during which the microprocessor is blocked and is unable to perform any other tasks.

The microprocessor configures, checks, and controls the at least one communication controller and/or the logic circuit contained therein as well as the configuration data of the active interface. The microprocessor reads out and evaluates and/or processes message objects already received in the message memory of the communication controller and automatically copied into the memory element of the microprocessor, calculating new memory objects and storing them in the memory element of the microprocessor. In addition, information is transmitted to the appropriate communication controllers so that they are able to transfer the up-to-the-minute data out of the memory element of the microprocessor to their own message memory.

It is also known that, for relieving the burden on the microprocessor of the microcontroller of a subscriber of the communication system, a DMA controller may be connected to the peripheral bus via a passive interface and an active interface as a so-called master. The DMA controller may perform a data transfer between the memory element of the microcontroller and the communication controller. It is configured and initialized by the microprocessor (host CPU) for this purpose. The DMA controller then transfers data word by word out of the communication controller into the memory element of the microcontroller or—if this function is supported—directly between the communication controllers. The end of data transfer is reported to the microprocessor via an interrupt, whereupon the microprocessor restarts the process for the next message. Processing of interrupts generates a large number of CPU commands, which ties up a large portion of the computation and memory resources of the microprocessor. In addition, the possible jitter (uncertainty with regard to the execution duration over time) of interrupted software tasks increases due to the frequent interrupts.

BRIEF SUMMARY OF THE INVENTION

An object of the present invention is therefore to optimize the gateway functionality within a subscriber of a communication system. In particular, in routing of messages among the communication controllers of a subscriber, the number of waiting cycles in the microprocessor of the subscriber and the interrupt load are to be reduced.

To achieve this object, on the basis of the subscriber of the above-defined type, it is proposed that at least one of the communication controllers have an active interface via which the communication controller is connected to the peripheral bus and a logic circuit for independent implementation of a gateway functionality.

According to the present invention, it is proposed that the communication controller be connected as a master to the peripheral bus instead of being connected as a so-called slave. In addition, the communication controller is provided with intelligence in the form of a logic circuit making it possible to coordinate and control independently a gateway functionality between a message memory of the communication controller and a memory of the microcontroller and/or among message memories of multiple communication controllers. A certain DMA functionality may be imparted to the communication controller by the logic circuit.

Thus, according to the present invention, the data transfer between the microcontroller (host CPU) of the subscriber and a message memory of a communication controller and among message memories of multiple communication controllers is optimized by adding an active interface. In particular, specific gateway functions, e.g., time-controlled or event-controlled data transfers, are supported in this way. Transmission of messages by the communication controller is handled automatically for the most part after an appropriate configuration by the microprocessor (host CPU) of the subscriber. The method according to the present invention reduces and/or avoids the previous high load on the microprocessor (host CPU) due to waiting cycles and interrupts because the messages may be transferred directly via the active interface.

The present invention may be used with any subscribers of any communication systems. The present invention is described below on the basis of a FlexRay communication system as an example. However, this reference to the FlexRay protocol should not be understood to be restrictive. The present invention may of course also be used in subscribers of a MOST (media-oriented systems transport) communication system, a CAN (controller area network) communication system, a TTCAN (time-triggered CAN) communication system, a LIN (local interconnect network) communication system or any other known communication system.

In addition to the passive interface, the communication controller according to the present invention has an active interface over which the logic circuit embedded in the communication controller is able to independently read message objects out of the message memory of the communication controller and write them into a memory of an appropriate destination (memory element of the microprocessor or message memory of a communication controller) as well as to read message objects out of a source (memory element of the microprocessor or message memory of a communication controller) and write them into the message memory of the communication controller according to the present invention. It is of course conceivable that not just one but multiple communication controllers of a subscriber are embodied in the manner according to the present invention. For the present invention, it is not necessary for all modules (communication controllers) to have an active interface. The active interface is designed to be able to independently request data from other modules (without being triggered by a controlling microcontroller or other controlling units).

A preferred gateway functionality which is implemented by the communication controller according to the present invention and/or its logic circuit is, for example, the routing (forwarding) of incoming messages within the network (including the peripheral bus, the microprocessor, the communication controller and possibly other modules). Essentially different routing methods are conceivable, some of which are discussed in greater detail below.

Static Routing:

This method is very simple and nonadaptive and is therefore widely used. Each node (communication controller) keeps a table having one row for each possible destination node. A row includes n entries, showing the best, second best, etc., transmission route for this destination together with weighting thereof. Before routing a data packet, the corresponding entry is selected from the table and put in one of the possible lines. The weighting here reflects the probability of this line being selected.

Centralized Routing:

Centralized routing is an adaptive method. Within the network there is a routing control center (RCC) to which each node periodically sends state information. For example, the state information pertains to a list of all active neighboring nodes, prevailing queue length, amount of traffic since the last message, etc. The RCC collects the state information and calculates the optimal path length between all nodes on the basis of this knowledge about the entire network. The RCC then sends each node a routing table on the basis of which the nodes make their routing decisions. The function of the RCC may be taken over by the communication controller according to the present invention and/or its logic circuit.

Advantage:
  The RCC theoretically has complete oversight and may thus make "perfect" decisions;
  Nodes need not perform complex calculations;
  Relieving the burden on the microprocessor of the subscriber because the function of the RCC is assumed at least in part by one or more communication controllers and/or their logic circuits.

Disadvantage:
  Calculation may take a very long time for large networks under some circumstances;
  Failure of the RCC paralyzes the entire network (unless a back-up computer is present and/or has been defined);
  Global inconsistencies are possible because nodes close to the RCC receive the new routing tables much sooner than those at a greater distance;
  Great load on the RCC due to the central function.

Isolated Routing

In this routing procedure, each node makes decisions only on the basis of the information that node itself collects and/or has collected. There is no exchange of routing information among nodes. Adaptation to changes in traffic or topology of the network (e.g., due to failure or addition of nodes) is thus possible here only to a limited extent but is fundamentally possible without any particularly great effort. The isolated routing methods include:
  Broadcast routing;
  Hot potato;
  Backward learning;
  Delta routing.

Broadcast Routing

A packet is sent to all nodes in broadcast routing. A distinction is made here between two variants: one in which a separate packet is created for each node and flooding in the other case, in which the same packet is transmitted to each node. Flooding is the simplest method and is not adaptive. Each incoming packet is routed on each transmission line except the line on which it arrived. Measures may also be taken here to dam up the flood, such as:
  Detection of duplicates of packets, by numbering the packets;
  Monitoring of the lifetime of packets by counting the partial distance traveled (hops);
  Selective flooding (routing to only some lines but not all lines);
  Random walk (random selection of a line).

Hot Potato

Each node attempts to pass on incoming packets as rapidly as possible (the nodes handle the packet like a hot potato, hence the name). The transmission line having the shortest queue is selected here. There are also combinations of this method with static routing:
  Selection of the best transmission line according to the static method as long as its queue length remains below a certain threshold;
  Selection of the transmission line having the shortest queue if its weight is too low (see static routing above).

Backward Learning

In this method the following information must be saved in the packet:
  Identification of the source node
  Counter that is incremented by one with each partial distance traveled (hop).

When a node receives a packet, it is able to recognize the number of hops and it knows via which input it received the packet. Each node is thus able to deduce from the packets received over which path it will be able to reach the other node with a minimum number of hops. An entry in the routing table is replaced when a packet having a lower number of hops than entered in the table reaches the node. However, these entries are also updated when no packet has been received from the particular node via a certain number of hops for a certain period of time. Thus learning periods during which better entries are overwritten with worse entries if they are a certain age are allowed at fixed intervals. It is then assumed that the better connection no longer exists and the next best is selected. This yields the following problems:

Routing is not optimal during the learning period;
    With short learning periods (entries are updated to the worse entries more rapidly) many packets take routes of an unknown quality;
    With long learning periods there is a poor adaptation response to the situation in the network.

Delta Routing

This method represents a combination of centralized routing and isolated routing. Each node here periodically measures the cost (in the sense of delay, utilization capacity, etc.) of each transmission route and sends this information to the RCC. The RCC then calculates the k best routes from nodes i to nodes j (a for all nodes i, j), taking into account only routes that differ in their initial line. The RCC sends the list of all equivalent routes for all determination sites to each node. For the most recent routing, a node may randomly select an equivalent route or make a decision on the basis of currently measured costs. The delta from which the name is derived here comes from the function with which it is possible to ascertain whether two routes are to be regarded as equivalent.

Distributed Adaptive Routing

In this method, each node periodically exchanges routing information with each of its neighbors. Here again each node maintains a routing table containing an entry for each other node in the network. This table contains the preferred transmission line for this node as well as an estimate with regard to the time or distance from this node:

Number of hops;
    Estimated delay in milliseconds;
    Estimated total number of packets waiting along the route.

These estimates are obtained from the time/distance from the neighbors (e.g., via special echo packets having a time stamp) and/or estimates of the neighbors. An exchange of routing information may be performed either synchronously at certain updating intervals or asynchronously in the event of significant changes. This method includes the following, among others:

Distance vector routing;
    Link state routing.

Distance Vector Routing

A distributed adaptive routing previously used on the Internet as RIP (routing information protocol), where each router maintains a table having the best distance (e.g., number of hops, delay, etc.) to each destination and the corresponding output. In practice, the convergence to a consistent state with this method is too slow for many routers due to the "count-to-infinity" problem.

Link State Routing

A distributed adaptive routing which is used on the Internet as OSPF (open shortest path first) and IS-IS (intermediate system to intermediate system). The following algorithm is used:

Discovering new neighbors via a so-called HELLO packet;
    Measuring the delay, i.e., cost to each neighboring node via a so-called ECHO packet;
    Creating a so-called LINK STATE packet having all the learned data (sender, list of neighbors with delay, age, etc.) which is generated periodically or on an event-controlled basis (e.g., new node, failure of a node, etc.);
    Sending this packet to all neighbors (in principle by flooding, but with refinement: eliminating duplicates, deleting information after a certain age, etc.);
    Calculation of the shortest path to all other routers (e.g., according to the Dijkstra algorithm).

This method is highly computation intensive but there are optimizations of this method which then belong to the particular topology, etc., of the network.

Hierarchical Routing

The basis of hierarchical routing is the division of large networks into regions. The nodes of a region have routing information only about their own region. In each region there is at least one outstanding node that functions as an interface to the other regions. In extremely large networks, additional hierarchies are possible on the basis of increasing size of the networks (regions, clusters, zones, groups, . . . ).

According to an advantageous refinement of the present invention, it is proposed that the logic circuit shall implement the functionality of a routing engine. The function of a routing engine of a communication controller is in particular to route incoming messages within the network (including the peripheral bus, the microprocessor, the communication controller and possibly additional modules). The functionality of a routing engine to be implemented pertains in particular to controlling and coordinating the routing procedures described in detail above.

According to an example embodiment of the present invention, it is proposed that the communication controllers shall each have a message memory for temporary storage of messages from the communication link assigned to the communication controller or for the communication link, such that the logic circuit coordinates and controls independent routing of data between the message memories of a communication controller and the microprocessor (host CPU) or the message memories of the communication controller.

According to a particularly advantageous refinement of the present invention that is particularly advantageous, at least one of the communication controllers has a communication module, which includes a message memory for temporary storage of messages from the communication link assigned to the communication controller or for the communication link, such that the logic circuit coordinates and controls an independent routing of data between the message memory of a communication controller or the message memory of the at least one communication module and the microprocessor or between the message memories of the communication controller and/or the message memory of the at least one communication module.

According to an example embodiment of the present invention, it is proposed that each communication module shall have at least one buffer memory situated between the message memory and the peripheral bus, preferably at least one input buffer memory and at least one output buffer memory, such that the logic circuit coordinates and controls independent routing of data between the message memory of a communication controller or the at least one buffer memory of the message memory of the at least one communication module and the microprocessor or between the message memories of the communication controller and/or the at least one buffer memory of the message memory of the at least one communication module.

The logic circuit in the communication controller advantageously includes a state machine, preferably a DMA state machine. The state machine is preferably implemented in the hardware and is hard-wired in the communication controller.

According to another example embodiment of the present invention, it is proposed that each of the communication controllers having an active interface and a logic circuit shall have an arbiter that arbitrates competing accesses of the microprocessor and the logic circuit (e.g., the state machine) to a message memory of the communication controller or to a message memory of a communication module or to at least one buffer memory of a message memory of a communication module.

Each of the communication controllers having an active interface and a logic circuit advantageously also has control and/or status registers to which the microprocessor has access for structure, triggering and/or monitoring the gateway functionality.

In addition, it is proposed that each of the communication controllers having an active interface and a logic circuit also has a routing memory to which the microprocessor has access for triggering and/or monitoring the gateway functionality.

The subscriber is preferably a component of a FlexRay communication system in which there is a transmission of data between the subscriber and other FlexRay subscribers connected to the FlexRay communication link according to the FlexRay protocol.

As another approach to achieving the object of the present invention, on the basis of the communication controller of the above-defined type, it is proposed that the communication controller have an active interface via which the communication controller is connected to the peripheral bus and a logic circuit for independent implementation of a gateway functionality.

As yet another approach to achieving the object of the present invention, on the basis of the method of the above-defined type, it is proposed that at least one of the communication controllers be connected to the peripheral bus via an active interface and the gateway functionality be implemented by a logic circuit in the at least one communication controller.

According to an advantageous refinement of the present invention, it is proposed that as part of the gateway functionality, interrupts shall be triggered and processed, messages fragmented and defragmented, and messages exchanged between communication controllers of the subscriber and/or between one of the communication controllers and the memory element of the microprocessor.

In addition, it is proposed that the microprocessor stores control and status information in a control and/or status register of the at least one communication controller and thereby configure, control and/or monitor the gateway functionality. Furthermore it is proposed that the microprocessor stores routing information in a routing memory of the at least one communication controller and thereby control and/or monitor the gateway functionality.

According to an example embodiment of the present invention, it is proposed that the logic circuit in the at least one communication controller include a state machine, such that competing accesses of the microprocessor and the state machine to a message memory of the communication controller or to a message memory of a communication module or to at least one buffer memory of a message memory of a communication module are arbitrated.

For active copying of data to a message memory of another communication controller, it is proposed that the following steps be independently triggered and controlled by the logic circuit of the at least one communication controller:

Visualizing the received data in a buffer memory of the at least one communication controller;

Creating a copy of the received data in a configurable address area of a memory element assigned to the microprocessor (host CPU) or in a buffer memory of another communication controller by write accesses via the active interface, and During creation of a copy of the data in a buffer memory of another communication controller, starting a transfer of the saved data from the buffer memory to a message memory of the other communication controller.

For active copying of data from a message memory of another communication controller, it is proposed that the following steps be triggered and controlled independently by the logic circuit of the at least one communication controller:

Visualizing the data in a buffer memory of the other communication controller;

Creating a copy of the content of a memory element assigned to the microprocessor or the buffer memory of the other communication controller in a configurable address area in at least one buffer memory of the communication controller by read accesses via the active interface, and Starting a transfer of the stored data from the at least one buffer memory into a message memory of the communication module of the communication controller.

Finally, it is proposed that the method of active copying of data into and/or out of a message memory of another communication controller be time-controlled, by reception of data, in particular a message, by triggering by the at least one communication controller or by triggering by the microprocessor. The triggering usually includes transmitting a special triggering command to the logic circuit.

DETAILED DESCRIPTION OF THE INVENTION

Figure 1:
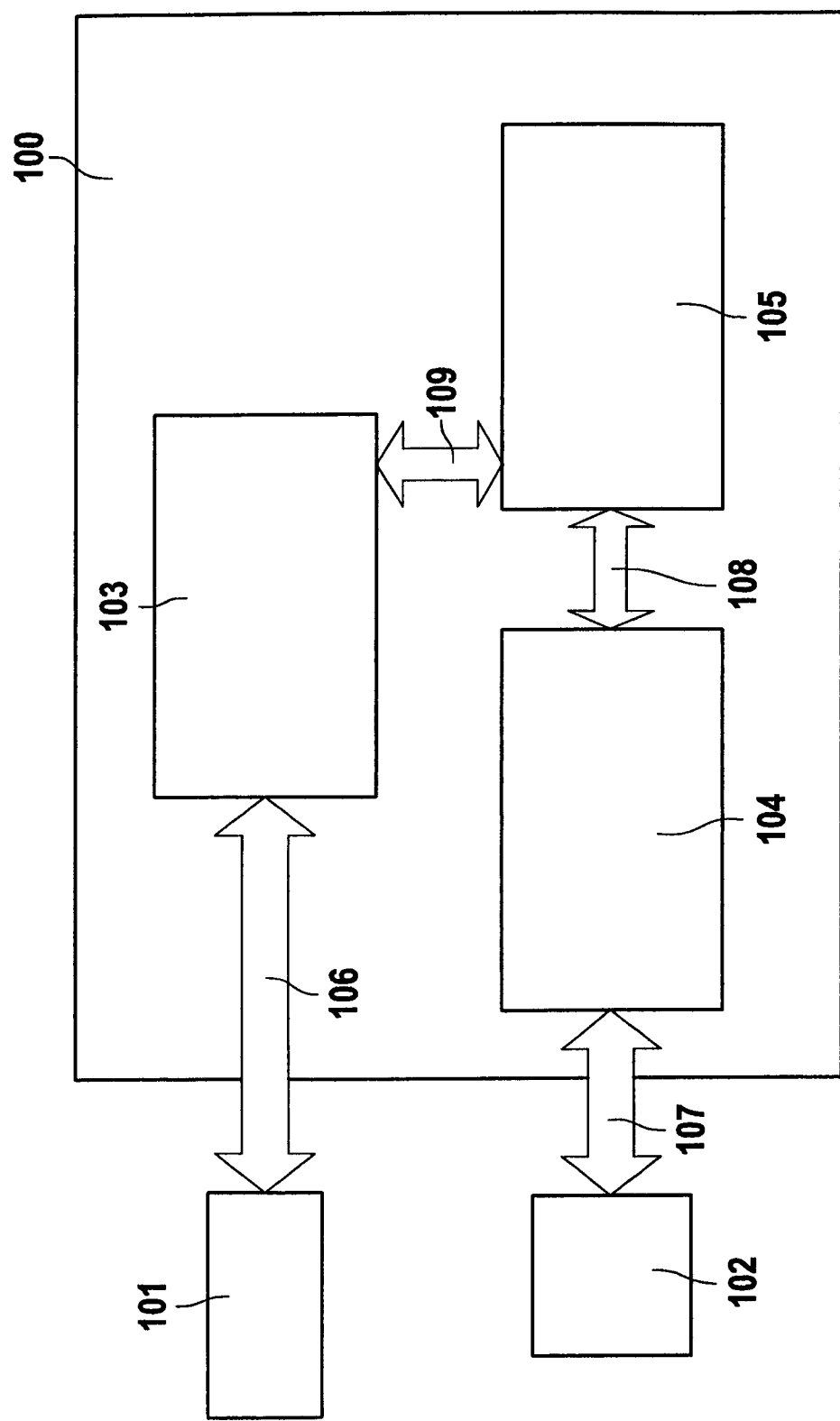
FIG. 1 shows a communication module and its connection to a communication link and a communication subscriber or host subscriber of a FlexRay communication system in a schematic diagram.

FIG. 1 schematically shows a FlexRay communication module 100 for connecting a subscriber or host 102 to a FlexRay communication link 101, i.e., the physical layer of the FlexRay. This is embodied, for example, as a FlexRay databus, preferably having two transmission lines. FlexRay communication module 100 is therefore connected to the subscriber, i.e., subscriber processor 102, via a link 107 and to communication link 101 via a link 106. For problem-free connection regarding transmission times, on the one hand, and also regarding data integrity, on the other hand, essentially three structures in the FlexRay communication module are differentiated schematically. A first structure 105 is used for storage, in particular temporary storage of at least a portion of the messages to be transmitted. A second structure 104 is connected between subscriber 102 and this first structure 105 via links 107 and 108. Likewise, a third structure 103 is connected between communication link 101 and first structure 105 via links 106 and 109, so that highly flexible input and output of data as part of messages, in particular FlexRay messages into and/or out of first structure 105, may be achieved at optimal speed while ensuring data integrity.

FIG. 2 again shows this communication module 100 in a preferred specific embodiment in detail. Particular connections 106 through 109 are also shown in detail. For connecting FlexRay communication module 100 to FlexRay subscribers 102 and/or the host processor, second structure 104 has an input buffer memory or input buffer memory 201 (input buffer IBF), an output buffer memory or output buffer memory 202 (output buffer OBF) and an interface module made up of two parts 203 and 204, one submodule 203 being independent of the subscriber and second submodule 204 being subscriber-specific. Subscriber-specific submodule 204 (customer CPU interface CIF) connects a subscriber-specific host CPU 102, i.e., a customer-specific subscriber 102, to FlexRay communication module 100. A bidirectional data line 216, an address line 217 and a control input 218 are provided for this purpose. An interrupt output 219 is also provided. Subscriber-specific submodule 204 is connected to a subscriber-independent submodule 203 (generic CPU interface GIF), i.e., the FlexRay communication module or FlexRay IP module has a generic, i.e., general CPU interface 203 to which a large number of different customer-specific host CPUs 102 may be connected via appropriate subscriber-specific submodules 204, i.e., customer CPU interfaces CIF. Therefore, only submodule 204 need be varied as a function of subscriber 102, which means a much lower complexity. CPU interface 203 and remaining communication module 100 may be used with no change.

The input buffer memory or input buffer memory 201 and the output buffer memory or output buffer memory 202 may be designed in a combined memory module or in separate memory modules. Input buffer memory 201 is for temporary storage of messages for transmission to a message memory 300. Input buffer module 201 is preferably designed to be able to store two complete messages, each having a header segment, in particular having configuration data, and a data segment or payload segment. Input buffer memory 201 is designed in two parts (partial buffer memory and shadow memory), so that the transmission between subscriber CPU 102 and message memory 300 may be accelerated by alternatingly writing to the two parts of the input buffer memory and/or by alternating access. Likewise, the output buffer memory or output buffer memory 202 (output buffer OBF) is used for temporary storage of messages for transmission from message memory 300 to subscriber CPU 102. Output buffer 202 is designed so that two complete messages, including a header segment, in particular with configuration data, and a data segment, i.e., payload segment, may be stored. Here again, output buffer memory 202 is divided into two parts, a partial buffer memory and a shadow memory, so that here again, transmission may be accelerated by alternating reading of the two parts and/or transmission between subscriber, i.e., host CPU 102, and message memory 300 may be accelerated through alternating access. This second structure 104 made up of blocks 201 through 204 is connected to first structure 105 as shown here.

Structure 105 includes a message handler 200 (message handler MHD) and a message memory 300 (message RAM). Message handler 200 controls and/or monitors the data transfer between input buffer memory 201 and output buffer memory 202 and message memory 300. Likewise it controls and/or monitors the data transmission in the other direction via third structure 103. Message memory 300 is preferably embodied as a single-ported RAM. This RAM memory saves the messages, i.e., message objects, i.e., the actual data together with configuration data and status data. The exact structure of message memory 300 is shown in greater detail in FIG. 3.

Third structure 103 has blocks 205 through 208. According to the two channels of the FlexRay physical layer, this structure 103 is divided into two data paths, each with two data directions. This is illustrated by links 213 and 214 in which the two data directions are represented for channel A as RxA and TxA for receiving (RxA) and transmitting (TxA) and for channel B with RxB and TxB. Link 215 denotes an optionally bidirectional control input. Third structure 103 is connected via a first buffer memory 205 for channel B and a second buffer memory 206 for channel A. These two buffer memories (transient buffer RAMs RAM A and RAM B) function as temporary memories for data transmission from and/or to first structure 105. According to the two channels, these two buffer memories 205 and 206 are each connected to an interface module 207 and 208, containing the FlexRay protocol controller or bus protocol controller having a transmitting/receiving shift register and FlexRay protocol finite state machine. Two buffer memories 205 and 206 thus function as temporary memories for data transmission between the shift registers of the interface modules or FlexRay protocol controllers 207 and 208 and message memory 300. Here again, the data fields, i.e., the payload segment or data segment of two FlexRay messages, are advantageously stored by each buffer memory 205 or 206.

In addition, communication module 100 is also shown as containing global time unit (GTU) 209 which is responsible for displaying the global time grid in FlexRay, i.e., microtick μT and macrotick MT. Likewise, error-tolerant clock synchronization of the cycle counters and control of the chronological sequences in the static and dynamic segments of the FlexRay are regulated via global time unit 209. Block 210 shows the general system control (system universal control, SUC) through which the operating modes of the FlexRay communication controller are monitored and regulated. These include wakeup, startup, reintegration and/or integration, normal operation and passive operation.

Block 211 shows the network and error management NEM as described in FlexRay protocol specification v2.0. Finally, block 212 shows interrupt control INT, which manages the status and error interrupt flags and monitors and/or controls interrupt outputs 219 to subscriber CPU 102. Block 212 also contains an absolute timer and a relative timer for generating the timer interrupts.

For communication in a FlexRay network, message objects, i.e., messages (message buffers) having up to 254 data bytes, may be configured. Message memory 300 is in particular a message RAM memory (message RAM) which may store up to max. 128 message objects, for example. All functions pertaining to the handling and/or management of the messages themselves are implemented in message handler 200. These include, for example, acceptance filtering, transfer of messages between the two FlexRay protocol controller blocks 207 and 208 and message memory 300, i.e., message RAM, and monitoring of the transmitter sequence and providing configuration data, i.e., status data.

An external CPU, i.e., an external processor of subscriber 102, is able to directly access the register of FlexRay communication module 100 via subscriber interface 107 having subscriber-specific part 204. A plurality of registers is used. These registers are used to configure and control the FlexRay protocol controller, i.e., interface modules 207 and 208, message handler (MHD) 200, global time unit (GTU) 209, general system controller (system universal controller, SUC) 210, network and error management unit (NEM) 211, interrupt controller (INT) 212 and access to the message RAM, i.e., message memory 300, and also to display the corresponding status. At least parts of these registers are discussed in greater detail in the discussion of FIGS. 4 through 6 and 7 through 9. A FlexRay communication module 100 described in this way allows simple implementation of FlexRay specification v2.0, so that an ASIC or microcontroller having the corresponding FlexRay functionality is easily generated.

The FlexRay protocol specification, in particular v2.0, may be fully supported by FlexRay communication module 100 described here, and thus up to 128 messages, i.e., message objects, for example, may be configured. This yields a flexibly configurable message memory for storage of different numbers of message objects, depending on the size of the particular data field and/or data area of the message. Thus advantageously messages or message objects having data fields of different lengths are to be configured. Message memory 300 is advantageously designed as FIFO (first in-first out) to yield a configurable receive FIFO. Each message, i.e., each message object in the memory, may be configured as a receive memory object (receive buffer), a transmit memory object (transmit buffer) or as part of the configurable receive FIFO. Likewise, acceptance filtering for frame ID, channel ID and cycle counter is also possible in the FlexRay network. Thus network management is expediently supported. Furthermore, maskable module interrupts are advantageously provided.

Figure 2:
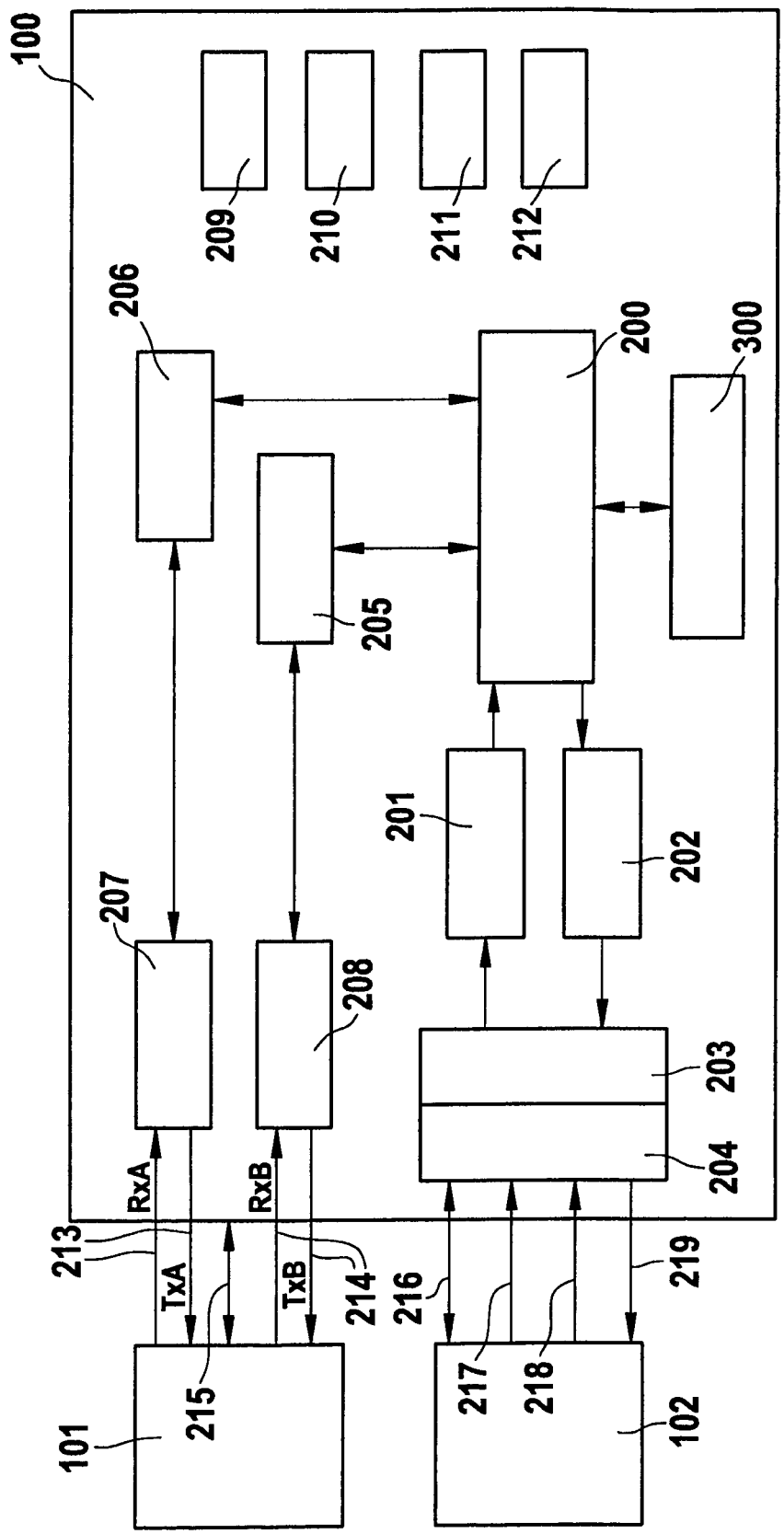
FIG. 2 shows an example embodiment of the communication module from FIG. 1 and its connection in detail.
Figure 3:
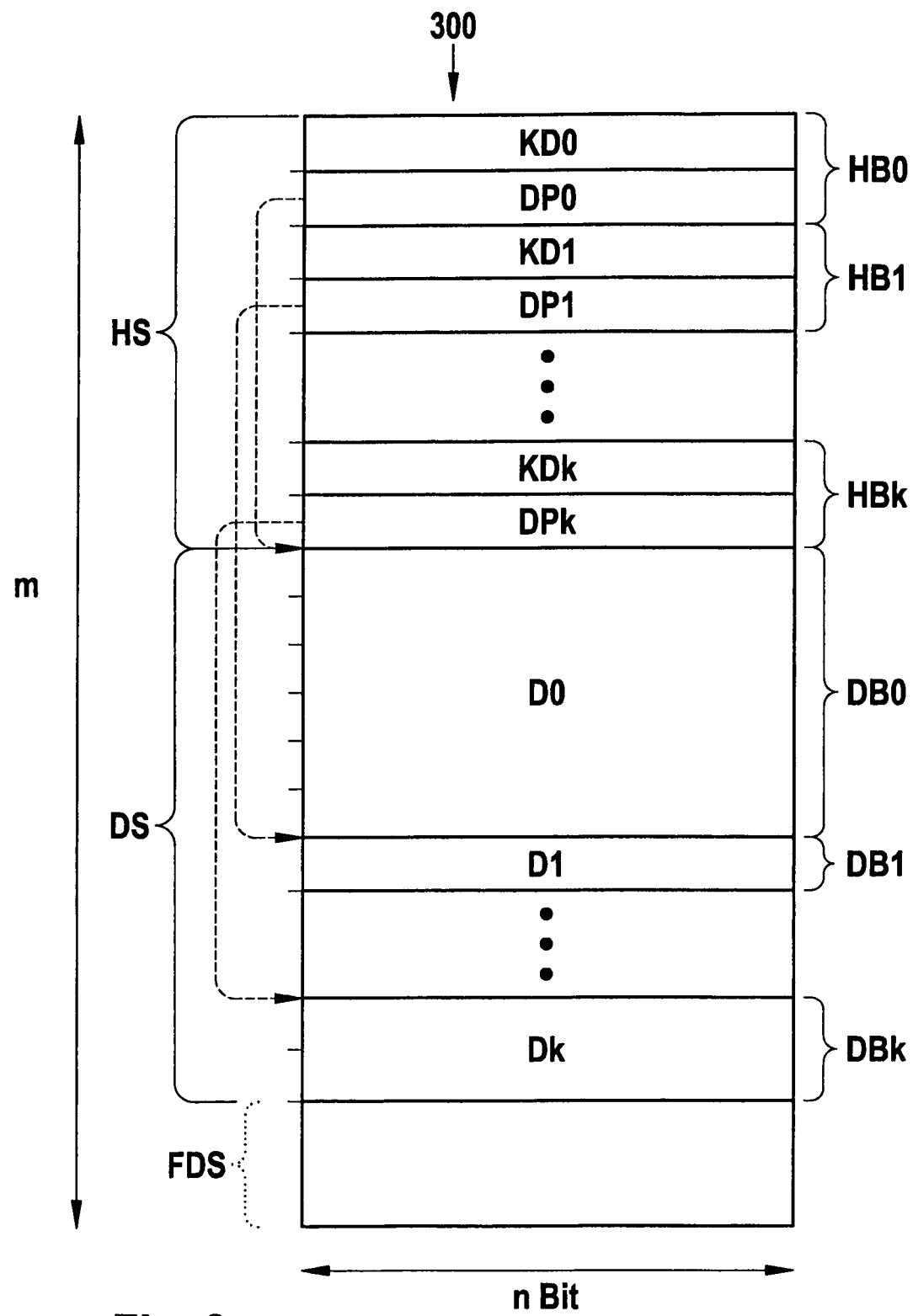
FIG. 3 shows the structure of a message memory of the communication module from FIG. 2.

FIG. 3 illustrates in detail the division of message memory 300. For the functionality of a FlexRay communication controller required under the FlexRay protocol specification, a message memory is needed for supplying messages to be sent (transmit buffer Tx) and for saving erroneously received messages (receive buffer Rx). A FlexRay protocol allows messages having a data area, i.e., a payload area, of 0 to 254 bytes. As shown in FIG. 2, message memory 300 is part of FlexRay communication module 100. The method described below and corresponding message memory 300 describe the storage of messages to be transmitted and messages received, in particular using a random access memory (RAM), in which it is possible through the mechanism described here to store a variable number of messages in a message memory of a given size. The number of storable messages depends on the size of the data areas of the individual messages, so that the size of the memory required may be minimized on the one hand without restricting the size of the data areas of the messages and while also achieving optimal utilization of the memory on the other hand. This variable division of a RAM-based message memory 300 in particular for a FlexRay communication controller will now be described in greater detail below.

For implementation, a message memory having a fixed word width of n bits, e.g., 8, 16, 32, etc., and a predetermined memory depth of m words shall now be assumed as an example (m, n as natural numbers). Message memory 300 is divided into two segments, a header segment HS and a data segment DS (payload section, payload segment). Thus a header area HB and a data area DB are created per message. Header areas HB0, HB1 through HBk and data areas DB0, DB1 through DBk are thus created for messages 0, 1 through k (k as a natural number). There is thus a differentiation between first and second data in a message, the first data corresponding to configuration data and/or status data with respect to the FlexRay message and being stored in a header area HB (HB0, HB1, . . . , HBk). The second data, corresponding to the actual useful data to be transmitted are stored accordingly in data areas DB (DB0, DB1, . . . , DBk). This results in a first data extent (measured in bits, bytes or memory words) for the first data per message and a second data extent (likewise measured in bits, bytes or memory words) for the second data of a message, such that the second data extent may be different for each message. The division between header segment HS and data segment DS is variable in message memory 300, i.e., there are no predetermined limits between the areas. The division between header segment HS and data segment DS is a function of number k of messages and of the second data extent, i.e., the extent of the actual useful data, a message and/or all k messages. A pointer element or data pointer DP0, DP1 through DPk is now assigned directly to configuration data KD0, KD1 through KDk of the particular message. In this specific embodiment, a fixed number of memory words, namely two here, is assigned to each header area HB0, HB1 through HBk, so that a structure datum KD (KD0, KD1, . . . , KDk) and a pointer element DP (DP0, DP1, . . . , DPk) are always stored together in a header area HB. Data segment DS is connected to this header segment HS having header areas HB, the size of which, i.e., first data extent, is a function of number k of messages for storage of actual message data D0, D1 through Dk. In its data extent, this data segment (or data section) DS depends on the particular data extent of the stored messages, here six words in DB0, one word in DB1 and two words in DBk, for example. Particular pointer elements DP0, DP1 through DPk thus always point to the beginning, i.e., the initial address of particular data area DB0, DB1 through DBk, where data D0, D1 through Dk of particular messages 0, 1 through k are stored. The division of message memory 300 between header segment HS and data segment DS is thus variable and depends on number k of messages themselves as well as the particular data extent of the message and thus the entire second data extent. If fewer messages are configured, header segment HS becomes smaller and the area becoming free in message memory 300 may be used for storage of data in addition to data segment DS. Optimal memory utilization may be ensured due to this variability, so it is also possible to use smaller memories. Free data segment FDS, in particular its size, which is also a function of the combination of a number k of stored messages and the particular second data extent of messages, is thus minimal and may even be 0.

In addition to the use of pointer elements, it is also possible to store the first and second data, i.e., configuration data KD (KD0, KD1, . . . , KDk) and actual data D (D0, D1, . . . , Dk) in a preselectable sequence, so that the sequence of header areas HB0 through HBk in header segment HS and the sequence of data areas DB0 through DBk in data segment DS are each identical. Under some circumstances it might then even be possible to omit a pointer element.

In a particular embodiment, an error identifier generator, in particular a parity bit generator element and an error detection checker, in particular a parity bit check element, are assigned to the message memory to ensure the correctness of the stored data in HS and DS in that a checksum may also be stored as a parity bit per memory word or per area (HB and/or DB) in particular. Other control identifiers, e.g., a CRC (cyclic redundancy check) or identifiers of a higher power such as ECC (error code correction), are also conceivable. The following advantages are thus achieved in comparison with a defined division of the message memory:

In programming, the user may decide whether he would like to use a larger number of messages having a small data field or a smaller number of messages having a large data field. In configuration of messages having data areas DB of different sizes, the available memory location is optimally utilized. The user has the option of utilizing a data memory area jointly for different messages.

In implementation of the communication controller on an integrated circuit, the size of message memory 300 may be adapted to the needs of the application by adapting the memory depth (number m of words) of the memory used without altering the other functions of the communication controller.

In addition, on the basis of FIGS. 4 through 6 and 7 through 9, the host CPU access, i.e., writing and reading of configuration data, i.e., status data and the actual data via buffer memory structures 201 and 202 are described in greater detail. The goal is to establish a separation with respect to the data transmission, so that data integrity may be ensured while at the same time a high transmission speed is ensured. These operations are controlled via message handler 200, which is described in greater detail below in conjunction with FIGS. 10, 11 and 12.

Figure 4:
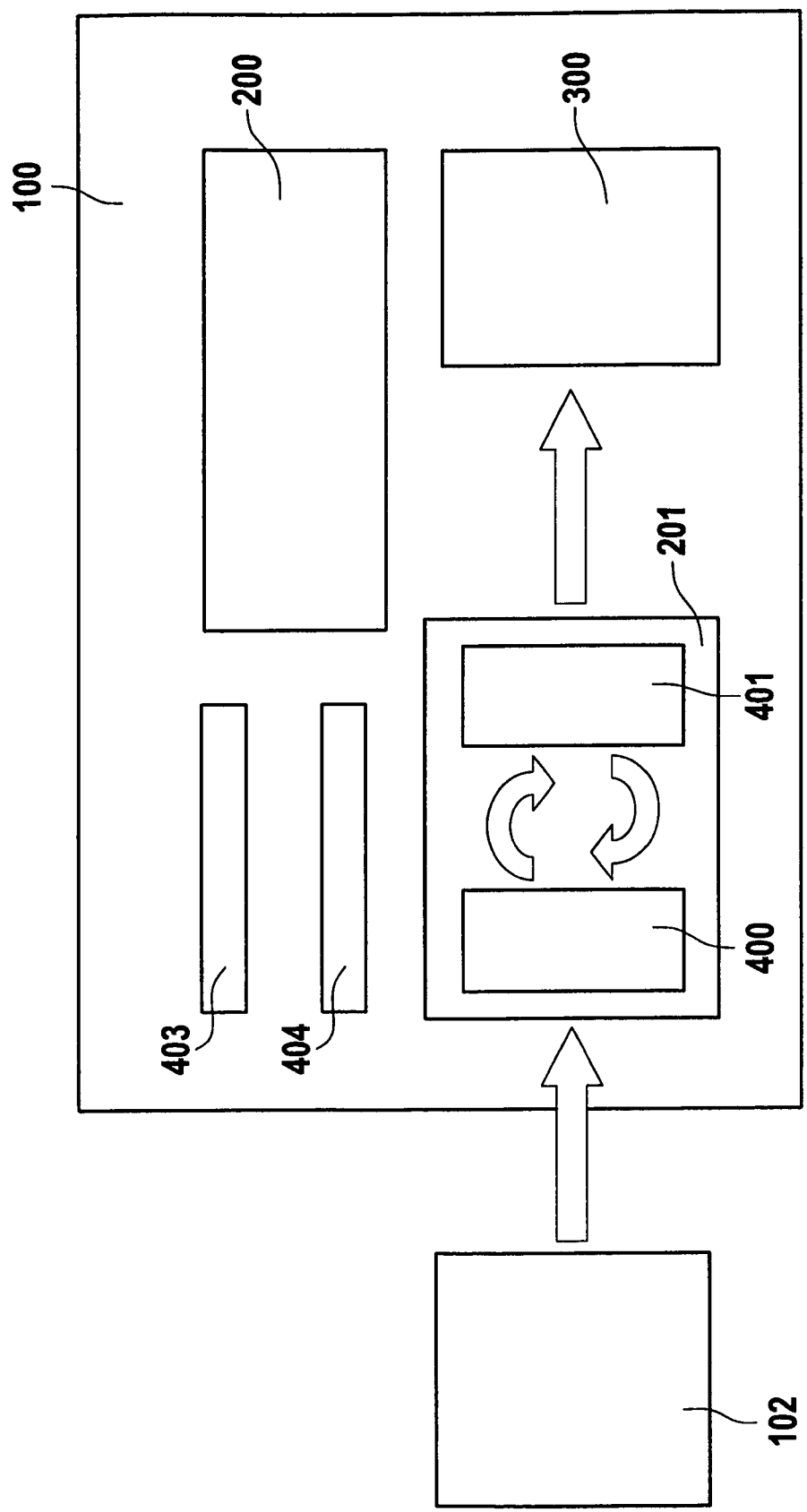
FIGS. 4 through 6 show the architecture and the method of data access in the direction from the subscriber to the message memory in a schematic diagram.
Figure 5:
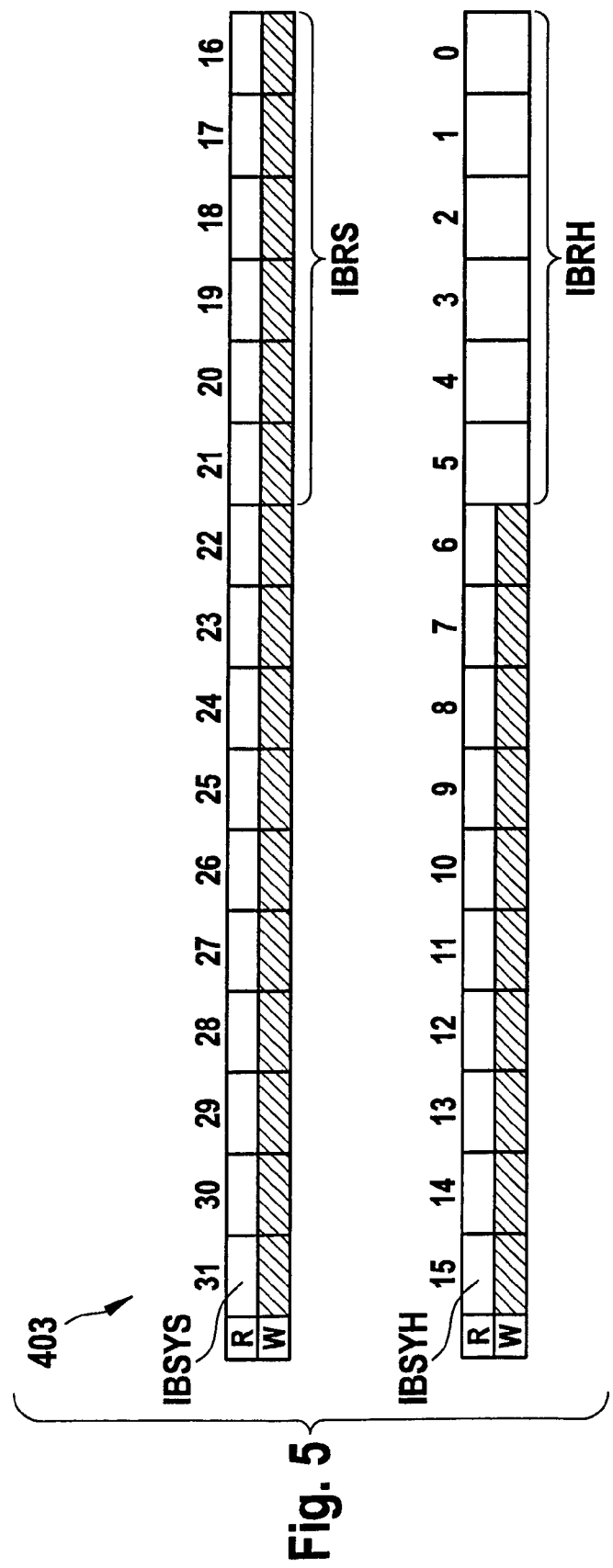
Figure 6:
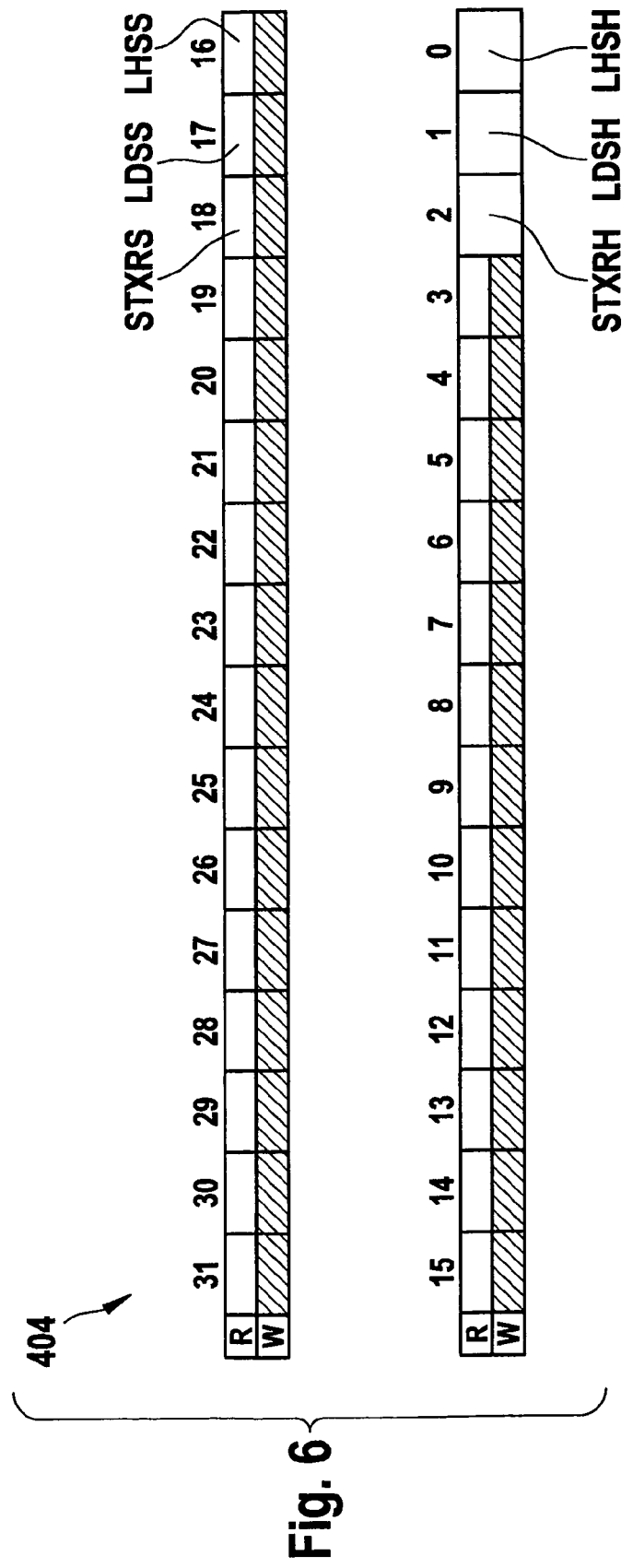

FIGS. 4, 5 and 6 first illustrate write accesses to message memory 300 by the host CPU of subscriber CPU 102 via input buffer memory 201. FIG. 4 again shows communication module 100, but for reasons of simplicity only the parts of communication module 100 that are relevant here are shown. These include, first, message handler 200, which is responsible for the control of the sequences, and two control registers 403 and 404, which may be accommodated outside of message handler 200 in communication module 100, as shown here, but may also be contained within message handler 200 itself. This also shows input buffer command request register 403 and input buffer command masking register 404. Write accesses of host CPU 102 to message memory 300 (message RAM) are thus made via an input buffer memory 201 (input buffer) connected in between. This input buffer memory 201 is now designed to be divided and/or doubled, namely as partial buffer memory 400 and a shadow memory 401 belonging to the partial buffer memory. Thus, as described below, host CPU 102 may have continuous access to the messages, i.e., message objects, i.e., data of message memory 300, and therefore data integrity and accelerated transmission are ensured.

The accesses are controlled via input request register 403 and input buffer command masking register 404. FIG. 5 shows the particular bit positions in 403 using the numbers from 0 through 31 in register 403, shown here as an example of a width of 32 bits. The same thing is also true of register 404 and bit positions 0 through 31 in masking register 404 from FIG. 6.

Bit positions 0 through 5, 15, 16 through 21 and 31 of register 403, for example, now obtain a special function with regard to the sequence control. An identifier IBRH (input buffer request host) may be entered into bit positions 0 through 5 of register 403 as a message identifier. Likewise, an identifier IBRS (input buffer request shadow) may be entered into bit positions 16 through 21 of register 403. Likewise, IBSYH is entered as an access identifier into register position 15 of 403 and IBSYS is entered into register position 31. Positions 0 through 2 of register 404 are also distinguished in the figure, additional identifiers being entered as data identifiers into 0 and 1 with LHSH (load header section host) and LDSH (load data section host). These data identifiers are designed here in the simplest form, namely each as one bit. A start identifier is written into bit position 2 of register 404 with STXRH (set transmission X request host). In addition, the sequence of read access to message memory 300 is also described via input buffer 201.

Host CPU 102 writes the data of the message to be transferred into input buffer memory 201. Host CPU 102 is able to write only configuration data and header data KD of a message for header segment HS of message memory 300 or only actual data D to be transmitted of a message for data segment DS of message memory 300 or both. The part of a message, i.e., configuration data and/or the actual data that is to be transmitted, is defined by special data identifiers LHSH and LDSH in the input marking register 404. LHSH (load header section host) defines whether the header data, i.e., configuration data KD, are transmitted and it is defined by LDSH (load data section host) whether data D are to be transmitted. Due to the fact that input buffer memory 201 is designed in two parts having a partial buffer memory 400 and a particular shadow memory 401 and there is to be mutual access, two other data identifier areas are provided as the counterpart to LHSH and LDSH, these two additional regions now being based on shadow memory 401. These data identifiers in bit positions 16 and 17 of register 404 are referred to as LHSS (load header section shadow) and LDSS (load data section shadow). The transmission operation with regard to shadow memory 401 is thus controlled by these identifiers.

If the start bit, i.e., start identifier STXRH (set transmission X request host) is now set in bit position 2 of input buffer command masking register 404, then after the transfer of the particular configuration data and/or actual data to be transferred into message memory 300 has been made, a transmission request for the corresponding message object is set automatically. In other words, this start identifier STXRH controls automatic transmission of a message object to be transmitted, in particular by starting it.

The counterpart to this accordingly for shadow memory 401 is start identifier STXRS (set transmission X request shadow), which is contained in bit position 18 of input marking register 404, for example, and here again is implemented as one bit in the simplest case. The function of STXRS is like the function of STXRH, except that it is based on shadow memory 401.

If host CPU 102 writes the message identifier, in particular the number of the message object in message memory 300 to which the data of input buffer memory 201 are to be transferred in bit positions 0 through 5 of input request register 403, i.e., after IBRH, then partial buffer memory 400 of input buffer memory 201 and particular shadow memory 401 are switched around and/or the particular access of host CPU 102 and message memory 300 to the two partial memories 400 and 401 are switched around, as indicated by the semicircular arrows. For example, the data transfer, i.e., data transmission to message memory 300 is also started. Data transmission to message memory 300 itself takes place from shadow memory 401. At the same time, register areas IBRH and IBRS are exchanged. Likewise LHSH and LDSH are exchanged for LHSS and LDSS. Also switched around are STXRH and STXRS. IBRS thus shows the identifier of the message, i.e., the number of the message object for which a transmission, i.e., a transfer from shadow memory 401 is underway, i.e., which message object, i.e., which area in message memory 300 received the last data (KD and/or D) from shadow memory 401. The identifier (here again 1 bit, for example) IBSYS (input buffer busy shadow) in bit position 31 of input request register 403 indicates whether there is currently a transmission involving shadow memory 401. At IBSYS=1, for example, there is a transmission from shadow memory 401 and at IBSYS=0 there is not. This IBSYS bit is set, e.g., by writing IBRH, i.e., bit positions 0 through 5 into register 403, to indicate that a transfer is underway between shadow memory 401 and message memory 300. After the end of this data transfer to message memory 300, IBSYS is reset again.

Host CPU 102 may write the next message to be transferred into input buffer memory 201 and/or partial buffer memory 400 while the data transfer from shadow memory 401 is taking place. With the help of another access code IBSYH (input buffer busy host) in bit position 15 of register 43, for example, the identifier may be further refined. If host CPU 102 is just now writing IBRH, i.e., bit positions 0 through 5 of register 403 while a transmission is taking place between shadow memory 401 and message memory 300, i.e., IBSYS=1, then IBSYH is set in input request register 403. As soon as the ongoing transfer, i.e., the ongoing transmission is concluded, the requested transfer (request by STXRH see above) is started and bit IBSYH is reset. Bit IBSYS remains set during the entire period of time to indicate that data are being transferred to message memory 300. All the bits used of all exemplary embodiments may also be implemented as identifiers having more than one bit. The one-bit approach is advantageous from the standpoint of both memory economy and processing economy.

The mechanism described here allows host CPU 102 to transfer data continuously into message objects in message memory 300, those objects having both head area HB and data area DB, assuming that the access rate of host CPU 102 to input buffer memory 201 is less than or equal to the internal data transfer rate of the FlexRay IP module, i.e., communication module 100.

Figure 7:
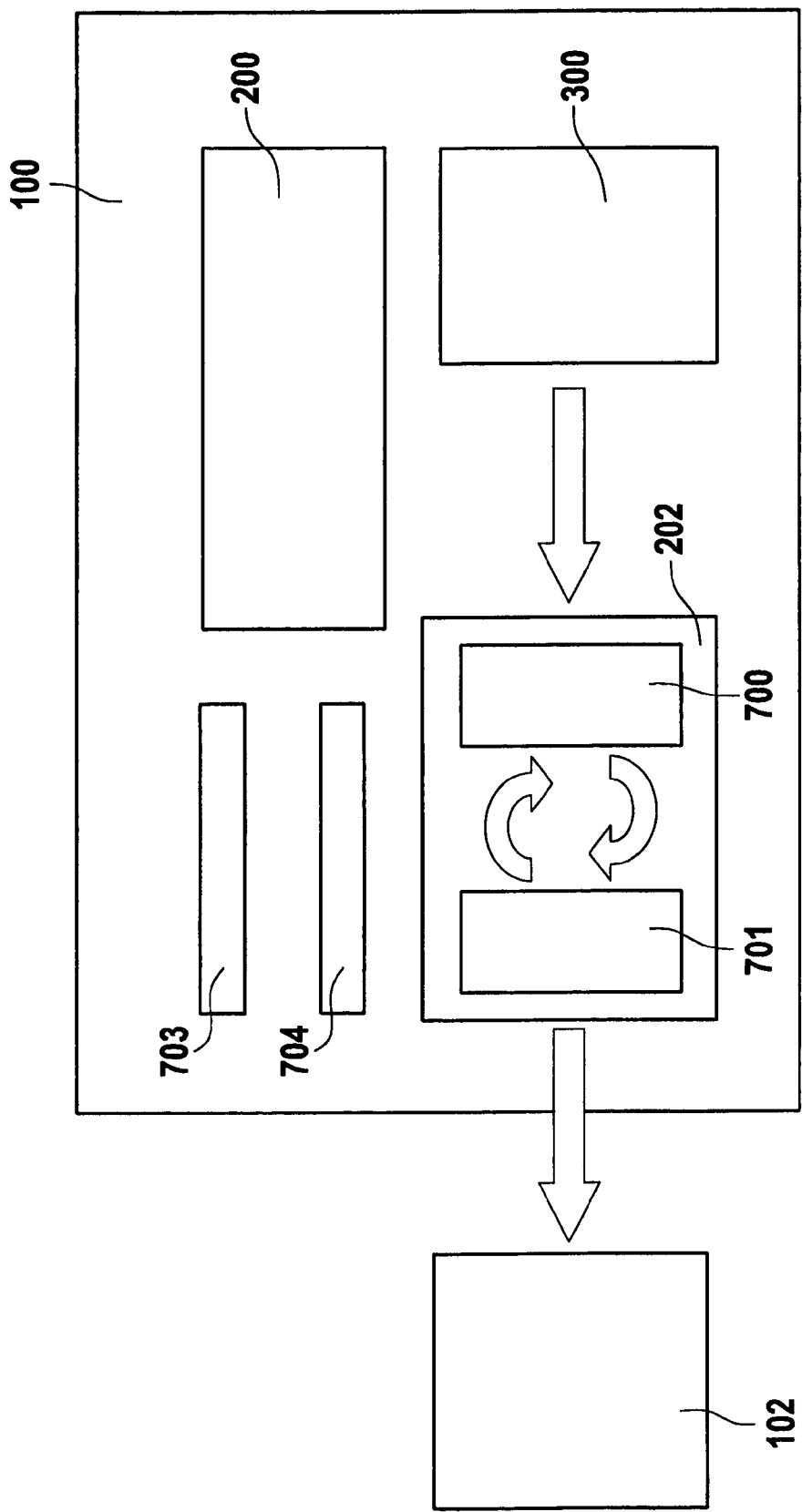
FIGS. 7 through 9 show the architecture and the process of data access in the direction from the message memory to the subscriber.
Figure 8:
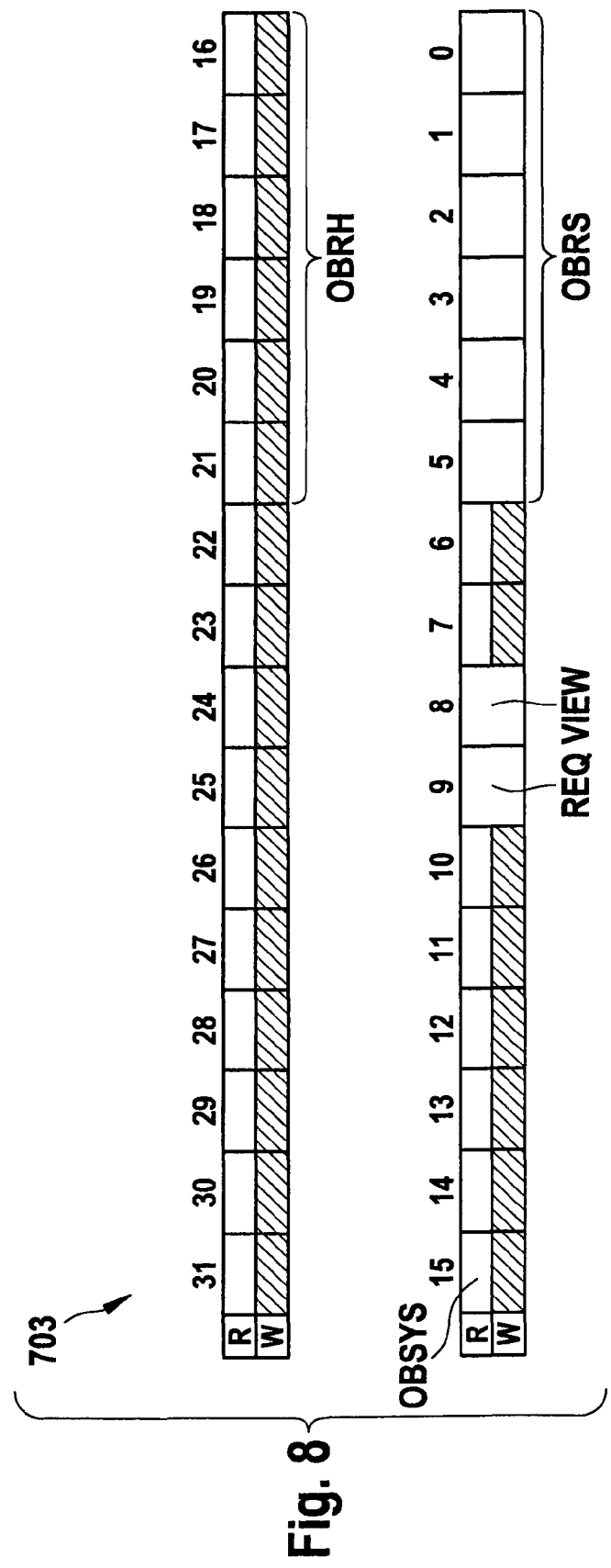
Figure 9:
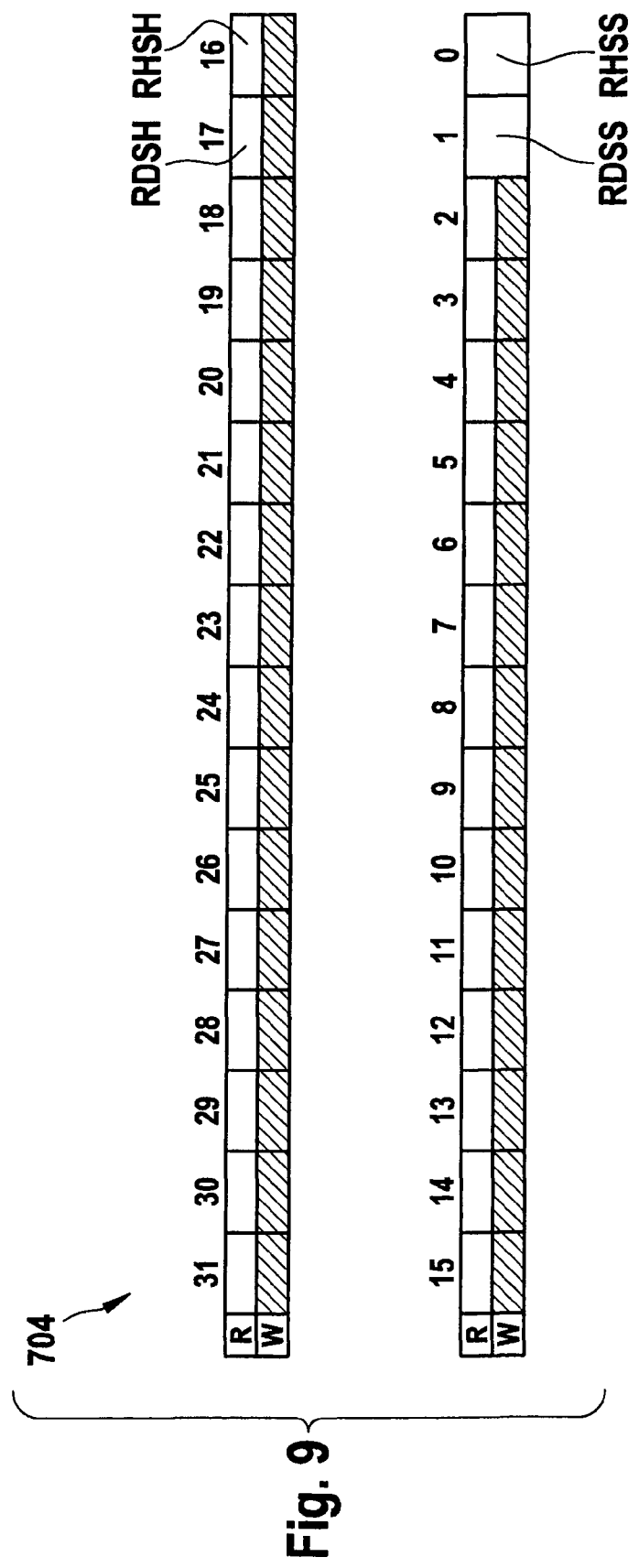

FIGS. 7, 8 and 9 illustrate the read accesses to message memory 300 by the host CPU or subscriber CPU 102 via the output buffer memory or output buffer 202. For this purpose, FIG. 7 illustrates again communication module 100, but for reasons of simplicity, here again only the relevant parts of communication module 100 are shown. These include, first, message handler 200, which is responsible for controlling the sequences, and two control registers 703 and 704, which may be accommodated outside of message handler 200 in communication module 100, as shown here, but may also be included in message handler 200 itself. This also shows output request register (output buffer command request register) 703 and the output masking register (output buffer command masking register) 704. Read accesses of host CPU 102 to message memory 300 thus take place via intermediate output buffer memory 202 (output buffer). This output buffer memory 202 is now also designed to be divided, i.e., doubled, namely as partial buffer memory 701 and a shadow memory 700 belonging to the partial buffer memory. Thus here again, as described below, there may be continuous access by host CPU 102 to the messages, i.e., message objects, i.e., data of message memory 300 and thus data integrity and accelerated transmission now in the opposite direction from message memory 300 to host 102 may be ensured. Access is controlled via output request register 703 and via output masking register 704. Also in register 703, the particular bit positions in 703 are shown here with numbers from 0 through 31 for a width of 32 bits as an example (see FIG. 8). The same thing is also true of register 704 and bit positions 0 through 31 in 704 (see FIG. 9).

Bit positions 0 through 5, 8 and 9, 15 and 16 through 21 of register 703, for example, now also have a special function with respect to read access sequence control. For example, an identifier OBRS (output buffer request shadow) may be entered as a message identifier into bit positions 0 through 5 of register 703. Likewise, an identifier OBRH (output buffer request host) may be entered into bit positions 16 through 21 of register 703. An identifier OBSYS (output buffer busy shadow) may be entered as an access identifier in bit position 15 of register 703. Places 0 and 1 of output masking register 704 are also shown, additional identifiers also being entered as data identifiers in bit positions 0 and 1 with RDSS (read data section shadow) and RHSS (read header section shadow). Additional data identifiers are provided, for example, in bit positions 16 and 17 with RDSH (read data section host) and RHSH (read header section host). Here again, these data identifiers are embodied in the simplest form, e.g., as one bit each. A start identifier REQ is entered in bit position 9 of register 703. Furthermore, a switch identifier VIEW is provided, entered in bit position 8 of register 703, for example.

Host CPU 102 requests the data of a message object from message memory 300 by writing the identifier of the desired message, i.e., in particular the number of the desired message object after OBRS, i.e., in bit positions 0 through 5 of register 703. Here again as in the opposite direction, host CPU 102 may either read only the status data, i.e., configuration data and header data KD of a message out of a header area or may read only data D actually to be transmitted of a message, i.e., out of the data area of both. The portion of the data that is to be transmitted from the header area and/or data is defined here by RHSS and RDSS in a manner comparable to that in the opposite direction. In other words, RHSS indicates whether the header data are to be read and RDSS indicates whether the actual data are to be read.

A start identifier starts the transmission from message memory 300 to shadow memory 700. In other words, if a single bit is used as the identifier as in the simplest case, then by setting the REQ bit in bit position 9 in output request register 703, transmission from message memory 300 to shadow memory 700 is started. The running transmission is again indicated by an access identifier, here again in the simplest case by an OBSYS bit in register 703. To avoid collisions, it is advantageous if the REQ bit may be set only when OBSYS has not been set, i.e., there is no running transmission at the moment. The message transfer between message memory 300 and shadow memory 700 also takes place here. The actual sequence could then be controlled on the one hand as described for FIGS. 4, 5 and 6, in a manner comparable to that for the opposite direction (complementary register occupancy) or, in a variation, by an additional identifier, namely a switch identifier VIEW in bit position 8 of register 703. In other words, after conclusion of the transmission, the OBSYS bit is reset and by setting the VIEW bit in output request register 703, partial buffer memory 701 and respective shadow memory 700 are switched around, i.e., the accesses thereto are switched around and host CPU 102 is then able to read out the message object requested from message memory 300, i.e., the appropriate message, out of partial buffer memory 701. Register cells OBRS and OBRH are again switched around here in a manner comparable to that of the opposite transmission direction in FIGS. 4 through 6. Likewise, RHSS and RDSS are switched around with RHSH and RDSH. Here again, it is possible to provide for the VIEW bit to be settable only when OBSYS is not set, i.e., when there is no ongoing transmission, as a safety mechanism.

Read accesses by host CPU 102 to message memory 300 thus take place only via the intermediate output buffer memory 202. This output buffer memory 202, like input buffer memory 201, is designed in duplicate, i.e., in two parts, to ensure continuous access by host CPU 102 to the message objects stored in message memory 300. Here again, the advantages of high data integrity and accelerated transmission are achieved.

Using input and output buffers 201, 202 described here ensures that a host CPU 102 is able to access message memory 300 without interruption despite the internal latency time within the module.

Figure 10:
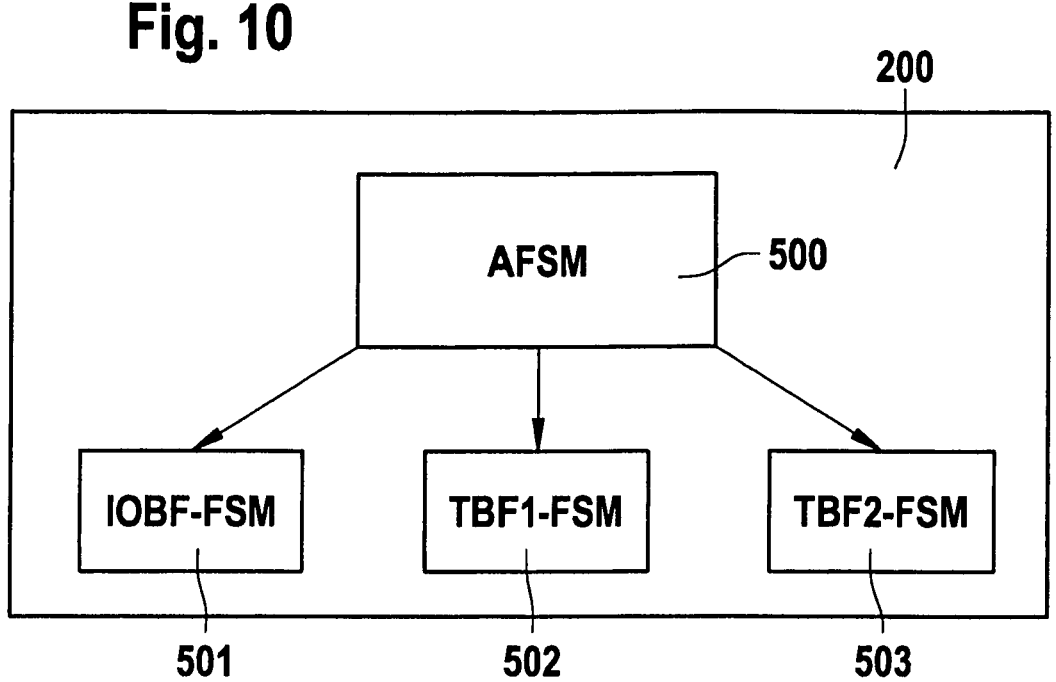
FIG. 10 shows the structure of a message handler and state machines contained therein in a schematic diagram.

To ensure this data integrity, the data transmission, in particular the routing in communication module 100, is performed by message handler 200 (message handler MHD). FIG. 10 therefore shows message handler 200. Message handler 200 may be represented in its functionality by multiple state machines or automatic state machines, i.e., so-called finite state machines (FSM). At least three state machines are provided here, and in one particular specific embodiment four finite state machines are provided. A first finite state machine is the IOBF-FSM labeled as 501 (input/output buffer state machine). For each direction of transmission with regard to input buffer memory 201 or output buffer memory 202, this IOBF-FSM could also be divided into two finite state machines, IBF-FSM (input buffer FSM) and OBF-FSM (output buffer FSM), so a maximum of five state machines (IBF-FSM, OBF-FSM, TBF1-FSM, TBF2-FSM, AFSM) would be conceivable. However, it is preferable to provide a shared IOBF-FSM. A second finite state machine is divided here into two blocks 502 and 503 according to the preferred exemplary embodiment and operates two channels A and B with regard to memories 205 and 206 as described in conjunction with FIG. 2. A finite state machine may be provided to operate both channels A and B or, as in the preferred form, a finite state machine TBF1-FSM labeled as 502 (transient buffer 1 (206, RAM A) state machine) may be provided for channel A and a TBF2-FSM labeled as 503 (transient buffer 2 (205, RAM B) state machine) may be provided for channel B.

To control the access by three finite state machines 501-503 in the preferred exemplary embodiment, an arbiter finite state machine, the so-called AFSM labeled as 500, is provided. The data (KD and/or D) are transmitted in a clock pulse generated by a clock pulse means, e.g., a VCO (voltage-controlled oscillator), a quartz oscillator, etc., or adapted therefrom in communication module 100. Clock pulse T may be generated in the module or provided by an external source, e.g., as a bus clock pulse. This arbiter finite state machine AFSM 500 provides accesses to message memory 300 to one of the three finite state machines 501-503 in alternation, in particular for one clock period T each. In other words, according to the access request by individual state machines 501, 502, 503, the available time is divided among these requesting state machines. If there is an access request from only one finite state machine, then the latter receives 100% of the access time, i.e., all clock pulses T. If there is an access request from two finite state machines, then each finite state machine receives 50% of the access time. Finally, if there is an access request from three state machines, each of the finite state machines receives one-third of the access time. The available bandwidth is therefore optimally utilized.

First finite state machine 501, i.e., IOBF-FSM, performs the following actions, if necessary:

Data transfer from input buffer memory 201 to selected message object in message memory 300, Data transfer from selected message object in message memory 300 to output buffer memory 202.

State machine 502 for channel A, i.e., TBF1-FSM, performs the following actions:

Data transfer from the selected message object in message memory 300 to buffer memory 206 of channel A.

Data transfer from buffer memory 206 to the selected message object in message memory 300.

Search for the suitable message object in message memory 300, the message object (receive buffer) being searched on reception for saving a message received on channel A and part of acceptance filtering and in sending the next message object (transmit buffer) to be transmitted on channel A.

The action of TBF2-FSM, i.e., the finite state machine for channel B in block 503, is similar to the above. It performs the data transfer from the selected message object in message memory 300 to buffer memory 205 of channel B and performs the data transfer from buffer memory 205 to the selected message object in message memory 300. As in the case of TBF1-FSM, the search function is also for a suitable message object in message memory 300, the message object (receive buffer) being searched on reception for saving a message received on channel B as part of acceptance filtering and in transmitting the next message or message object (transmit buffer) to be transmitted on channel B.

Figure 11:
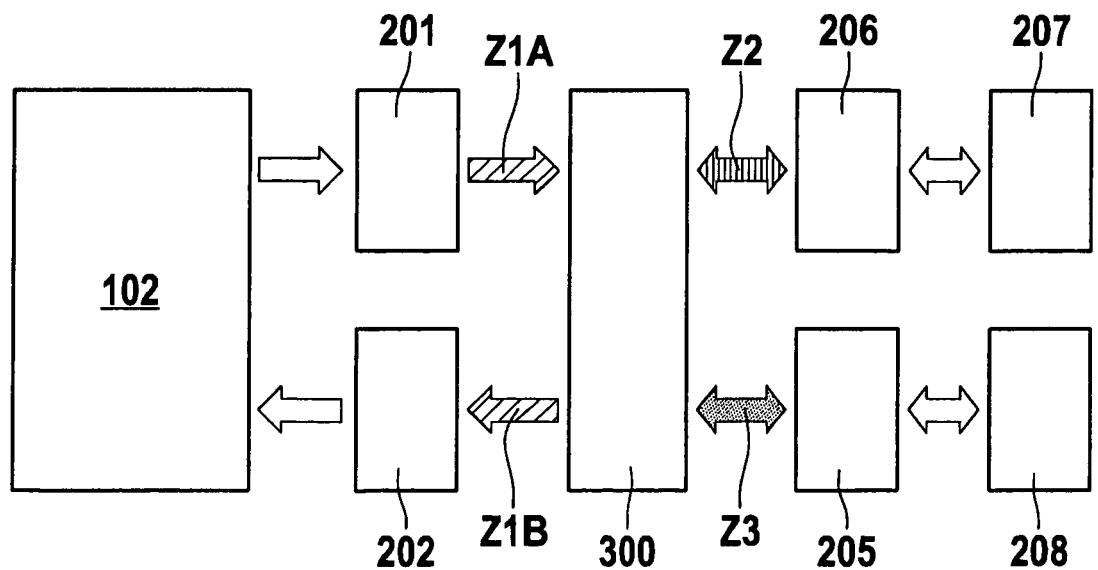
FIG. 11 shows the components of the communication module from FIGS. 1 and 2 and the subscribers and the corresponding data paths controlled by the message handler in a schematic diagram.

FIG. 11 illustrates again the sequences and the transmission pathways. Three state machines 501-503 control the particular data transmissions among the individual components. Again, the host CPU is labeled as 102, the input buffer memory as 201 and the output buffer memory as 202. The message memory is 300 and the two buffer memories for channel A and channel B are 206 and 205, respectively. Interface elements 207 and 208 are also shown here. First finite state machine IOBF-FSM 501 controls data transfer Z1A and Z1B, i.e., from input buffer memory 201 to message memory 300 and from message memory 300 to output buffer memory 202. Data transmission here goes over data buses having a word width of 32 bits, for example, but any other number of bits is also possible. This also applies to transmission Z2 between the message memory and buffer memory 206. This data transmission is controlled by TBFI-FSM, i.e., finite state machine 502 for channel A. Transmission Z3 between message memory 300 and buffer memory 205 is controlled by finite state machine TBF2-FSM, i.e., 503. Here again, the data transfer takes place via data buses having a word width of 32 bits, for example, but again any other number of bits is also possible. The transfer of a complete message object over the aforementioned transmission pathways normally requires multiple clock periods T. Therefore there is a division of the transmission time based on clock periods T by the arbiter, i.e., AFSM 500. FIG. 11 thus shows the data paths between memory components controlled by message handler 200. To ensure the data integrity of message objects stored in message memory 300, data should advantageously be exchanged at the same time on only one of the paths depicted, i.e., Z1A and Z1B as well as Z2 and Z3 at the same time.

Figure 12:
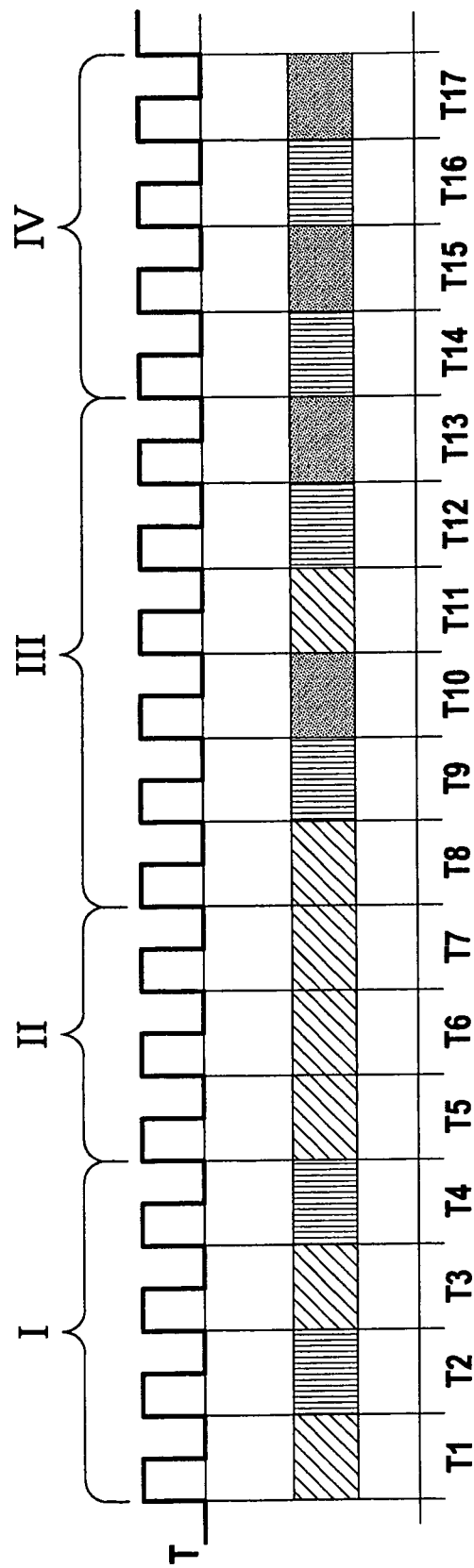
FIG. 12 shows the access distribution to the message memory based on the data paths in FIG. 1.

FIG. 12 shows an example of how available system clock pulses T are divided by the arbiter, i.e., AFSM 500, among the three requesting finite state machines. In phase 1 (I) there are access requests from finite state machine 501 and finite state machine 502, i.e., the total time is divided in half between the two requesting finite state machines. Based on the clock periods in phase 1 (I), this means that finite state machine 501 gains access in clock periods T1 and T3 and finite state machine 502 gains access in clock periods T2 and T4. In phase 2 (II), access is only via state machine 501, so that all three clock periods, i.e., 100% of the access time from T5 to T7 to IOBF-FSM is omitted. In phase 3 (III), there are access requests from all three finite state machines 501 through 503, so the total access time is divided into three portions. Arbiter AFSM 500 then distributes the access time, for example, in such a way that in clock periods T8 and T11, finite state machine 501 has access, in clock periods T9 and T12 finite state machine 502 has access, and in clock periods T10 and T13 finite state machine 503 has access. Finally, in phase 4 (IV), access is via two finite state machines 502 and 503 to the two channels A and B of communication module 100, so there is an access distribution of clock periods T14 and T16 to finite state machine 502 and in T15 and T17 to finite state machine 503.

Arbiter state machine AFSM 500 thus ensures that, if more than one of three state machines 501-503 makes a request for access to message memory 300, the access is allocated by cycles and alternately to requesting state machines 501-503. This procedure ensures the integrity of the message objects stored in message memory 300, i.e., ensures data integrity. For example, if host CPU 102 wants to read out a message object via output buffer memory 202 while a received message is being written into this message object, then depending on which request was started first, either the old state or the new state is read out without the accesses in the message object in message memory 300 themselves colliding.

The method described here allows host CPU 102 to read or write any message object into the message memory 300 during ongoing operation without blocking the selected message object from participating in the data exchange on both channels of FlexRay bus 101 for the duration of the access of host CPU 102 (buffer locking). At the same time, by interleaving of the accesses in cycles, the integrity of the data stored in message memory 300 is ensured and the transmission rate, i.e., the utilization of the full bandwidth, is increased.

Figure 17:
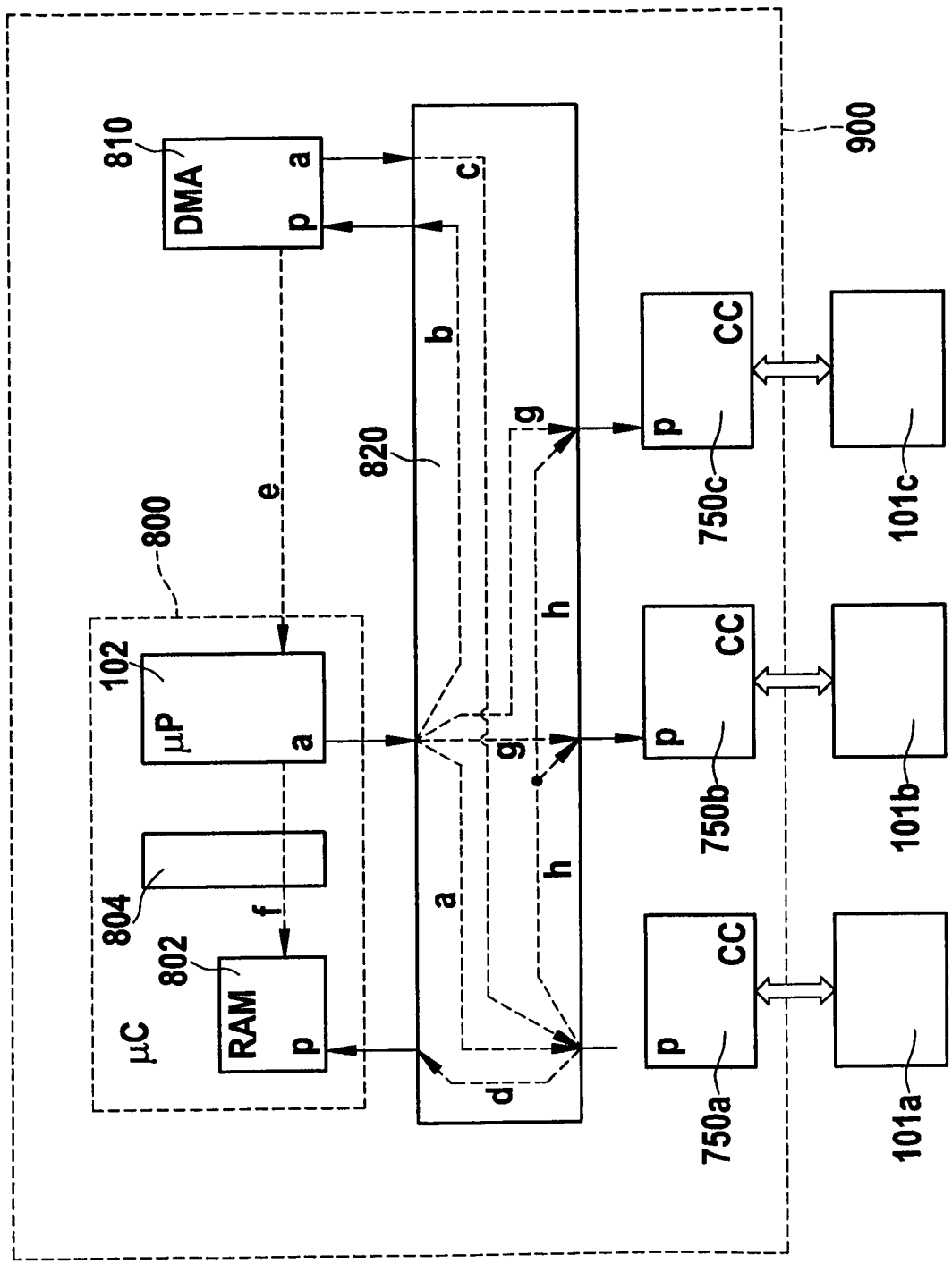
FIG. 17 shows a subscriber of a communication system known from the related art.

Up to now, both the subscriber and the microprocessor (the host CPU) of the subscriber have been labeled using reference numeral 102 and depicted as equivalent in the description. However, a differentiation is necessary for the following description of the present invention. Therefore, hereinafter, reference numeral 900 is being introduced for all of the FlexRay subscribers, while reference numeral 102 refers only to the microprocessor (the host CPU) of subscriber 900. For a more detailed explanation, reference is made to FIG. 17, where a subscriber 900 known from the related art is shown.

Known subscriber 900 includes a microcontroller 800, a DMA (direct memory access) controller 810, a peripheral bus 820 and multiple, namely three, FlexRay communication controllers 750a, 750b, 750c in the exemplary embodiment shown here. Peripheral bus 820 may be implemented as any internal databus. Often proprietary data buses are used as peripheral buses because the entire component labeled as 900 is usually manufactured by one and the same semiconductor manufacturer. Only internal components 800, 810 and 750 in part 900 must communicate via peripheral bus 820.

Use of a DMA controller 810 is optional. There are also known subscribers 900 with which the data transmission between microcontroller 800 and one of communication controllers 750 and/or between communication controllers 750 functions without a DMA controller 810.

Microcontroller 800 includes microprocessor 102 (host CPU), a memory element 802 and a core bus 804. Memory element 802 may be implemented as a dual-ported tightly coupled memory (TCM), for example. Microcontroller 800 is connected to peripheral bus 820 via an active interface "a" of microprocessor 102 and a passive interface "p" of memory element 802. DMA controller 810 is also connected to peripheral bus 820 via an active interface "a" and a passive interface "p"—if present at all. However, communication controllers 750 are connected to peripheral bus 820 only via a passive interface "p" in known subscriber 900. Thus, in other words, microcontroller 800 and DMA controller 810 are connected as masters to peripheral bus 820, whereas communication controllers 750 are connected to bus 820 only as slaves.

Microprocessor 102 configures, controls and monitors individual communication controllers 750. Microprocessor 102 reads, processes, and evaluates received messages, calculates and generates new messages, and ensures that the messages are written for sending via communication link 101. For example, with simple gateway operations it is often necessary to read out the received data from one of communication controllers 750 and write the data to one or more other communication controllers 750 for transmission. To implement a gateway functionality within subscriber 900 without using a DMA controller 810, microprocessor 102 transmits data word by word out of communication controllers 750 (dashed line a) into memory element 802 of microcontroller 800 (dashed line f) or a memory internal to the CPU (not shown) to process the data, if necessary, and then copy it into corresponding communication controllers 750 (dashed lines g). At the high clock rates of microprocessor 102 customary today, several waiting cycles occur, during which microprocessor 102 waits for the end of the data transmission, i.e., is blocked and unable to perform any other tasks.

If a DMA controller 810 is used, it is able to perform the data transfer between memory element 802 of microcontroller 800 and communication controllers 750. It is therefore configured by microprocessor 102 and started (dashed line b). DMA controller 810 then transmits data word by word out of communication controllers 750 (dashed line c) into memory 802 of microcontroller 800 (dashed line d) or directly among communication controllers 750 (dashed line h). The end of the data transmission is reported to microprocessor 102 via an interrupt (dashed line e), whereupon microprocessor 102 begins the process anew for the next message. Processing of interrupts generates a large number of CPU commands, which tie up a large portion of the computation and memory resources of microprocessor 102. In addition, due to the frequent interrupts, there is an increase in the possible jitter (uncertainty with regard to the duration of execution over time) of interrupted software tasks.

Figure 13:
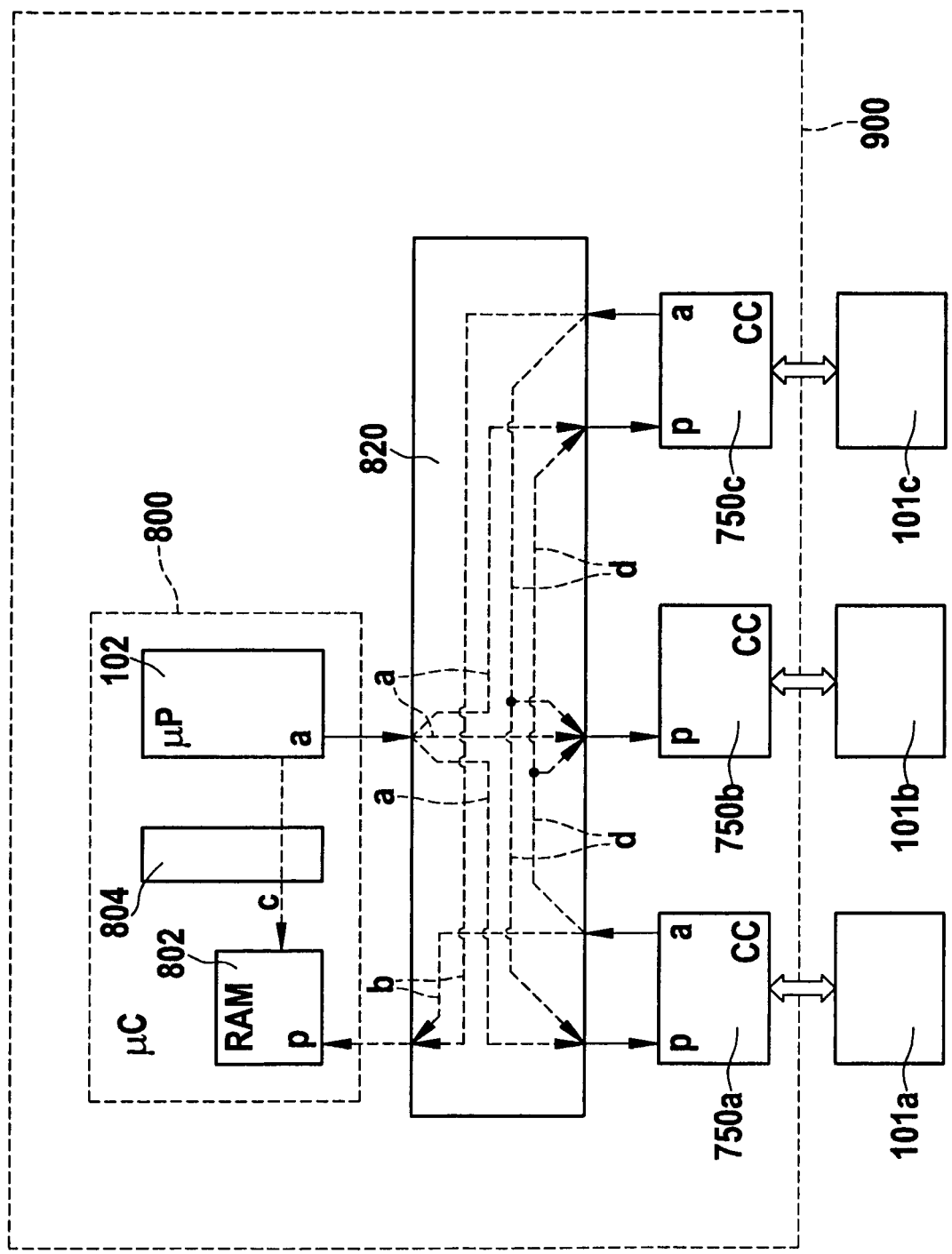
FIG. 13 shows a subscriber according to the present invention of a communication system.

FIG. 13 shows a subscriber 900 according to the present invention of a FlexRay communication system. This shows clearly that two communication controllers 750, namely communication controller 750a and communication controller 750c, are connected to peripheral bus 820 via a passive interface "p" as well as an active interface "a." This means that communication controllers 750a, 750c are connected to peripheral bus 820 not as slaves but instead as masters. Communication controllers 750a, 750c are thus able to receive and process not only commands and data from other modules connected to bus 820 (e.g., microcontroller 800 or other communication controllers 750) but may themselves also evaluate received messages (data and commands), calculate new messages and send them over peripheral bus 820 to microcontroller 800 or other communication controllers 750.

Microprocessor 102 configures and monitors communication controllers 750 and the configuration data of active interface "a" (dashed line a). Microprocessor 102 reads out message objects already received and automatically copied into memory element 802 (dashed line b), evaluates and processes them (dashed line c), calculates and generates new message objects and deposits them in memory element 802 (dashed line c). In addition, information is sent to corresponding communication controllers 750 indicating that they may transfer recent data out of memory element 802 into their own message memory 300 (dashed line a). The transfer is performed automatically by communication controllers 750a, 750c. Message memory 300 stores the message objects (so-called message buffer) together with the configuration and status information.

In addition to the implementation known from the related art, communication controllers 750a, 750c each have an active interface "a" via which a logic circuit embedded in controller 750 may automatically read message objects out of message memory 300 and write them to an appropriate destination (to memory element 802 or to message memory 300 of another communication controller 750) in addition to being able to read message objects out of a source (memory element 802 or message memory 300 of other communication controllers 750) and write them into message memory 300. Routing into and out of memory element 802 is indicated with dashed line b, and routing between communication controllers is indicated by dashed line d. Active interface "a" of communication controllers 750a, 750c is implemented to be able to automatically request data from other modules (e.g., from communication controller 750b) even without triggering by a controlling microcontroller 800 or some other controlling unit. For the present invention, it is not necessary for all modules to have an active interface "a."

For starting the data transmission, communication controllers 750a, 750c may regularly check with an active interface "a" on whether new data have been entered into memory element 802 of microcontroller 800 or into message memory 300 of one of communication controllers 750. In particular this checks on whether a new message object has been deposited in memory element 802 and/or whether a control register 703, 704 for an output buffer memory (output buffer OBF) 202 of message memory 300 of one of communication controllers 750 indicates a new message object.

The method according to the present invention for active copying of data from the message memory of communication controller 750a into and/or out of a message memory of another communication controller 750b, 750c may be triggered in a time-controlled manner (e.g., periodically) by the reception of data, in particular a message, by a change in received data, by triggering by one of the other communication controllers 750b, 750c or by triggering by microprocessor 102 of communication controller 750a. Triggering usually includes the transfer of a special triggering command to the logic circuit.

Figure 14:
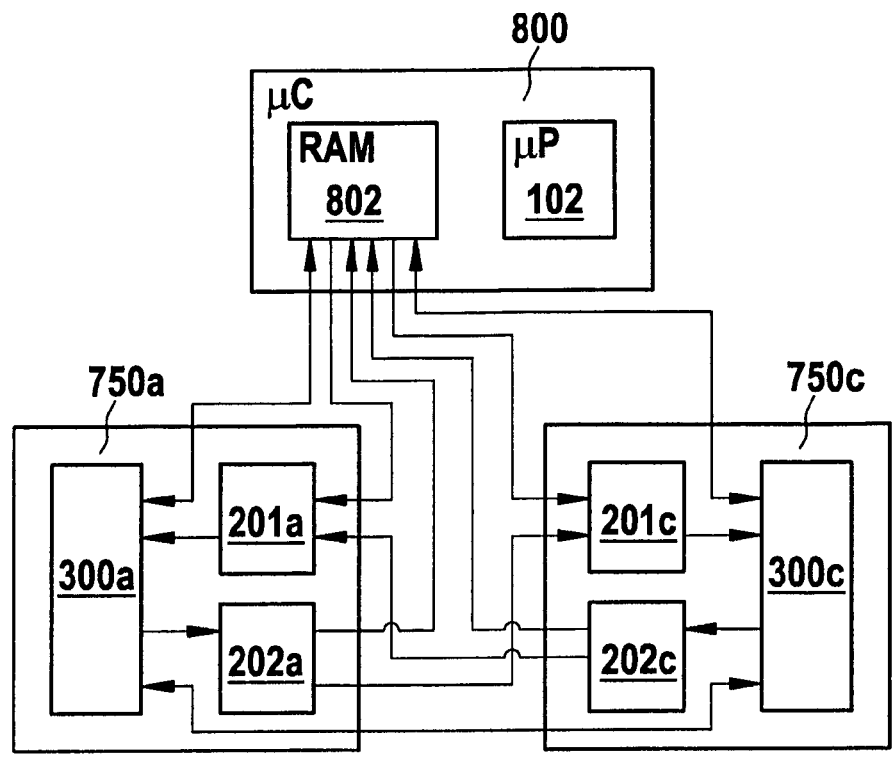
FIG. 14 shows possible transmission routes for routed data in a subscriber according to the present invention.

FIG. 14 illustrates possible transmission paths for routed data in subscriber 900 according to the present invention. As already described above, communication controllers 750 include a message memory 300 and may also include buffer memories, in particular at least one input buffer memory 201 and at least one output buffer memory 202. Depending on the precise design of communication controllers 750, the logic circuit of communication controller 750a, for example, may now route data on the transmission paths listed below with an active interface "a":

between message memory 300a and memory element 802 of microcontroller 800 (usually only during initialization of communication module 100, otherwise special design of the hardware required), from memory element 802 into input buffer memory 201a, from output buffer memory 202c of the other communication controller 750c into input buffer memory 201a, out of output buffer memory 202a into memory element 802, out of output buffer memory 202a into input buffer memory 201c of the other communication controller 750c, out of message memories 300a and 300c into output buffer memories 202a and/or 202d, and out of input buffer memories 201a and 201c into message memories 300a and/or 300c.

Similarly, the logic circuit of the other communication controller 750c having an active interface "a" may route data on the transmission paths listed below:

between message memory 300c and memory element 802 of microcontroller 800 (usually only during initialization of communication module), from memory element 802 into input buffer memory 201c, from output buffer memory 202a of communication controller 750a into input buffer memory 201c, out of output buffer memory 202c into memory element 802, out of output buffer memory 202c into input buffer memory 201a of communication controller 750a, out of message memories 300a and 300c into output buffer memories 202a and/or 202c, and out of input buffer memories 201a and 201c into message memories 300a and/or 300c.

Figure 15:
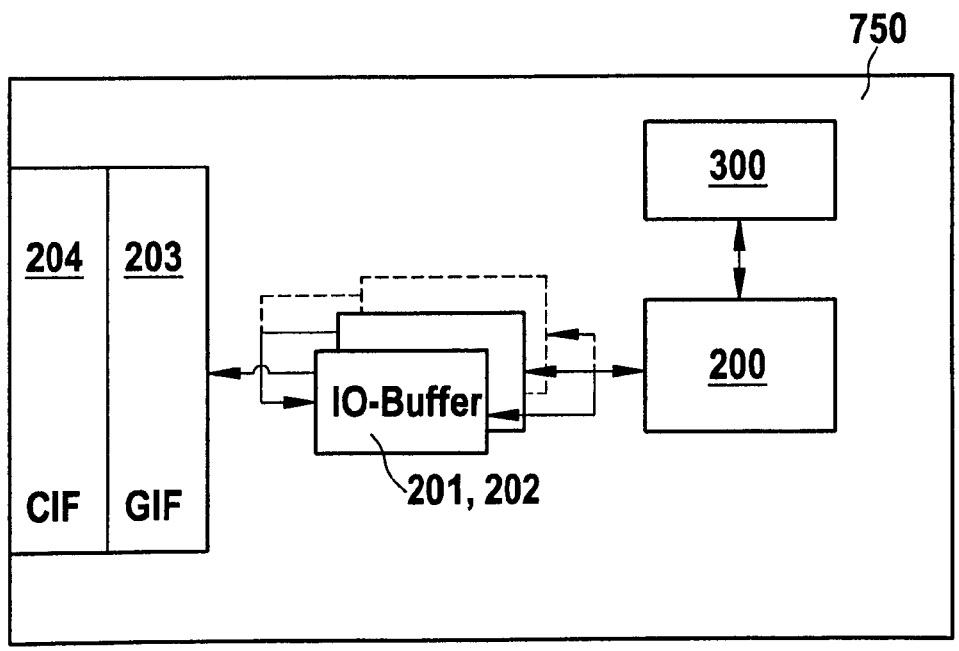
FIG. 15 shows a communication controller according to the present invention of the subscriber from FIG. 13 in detail.
Figure 16:
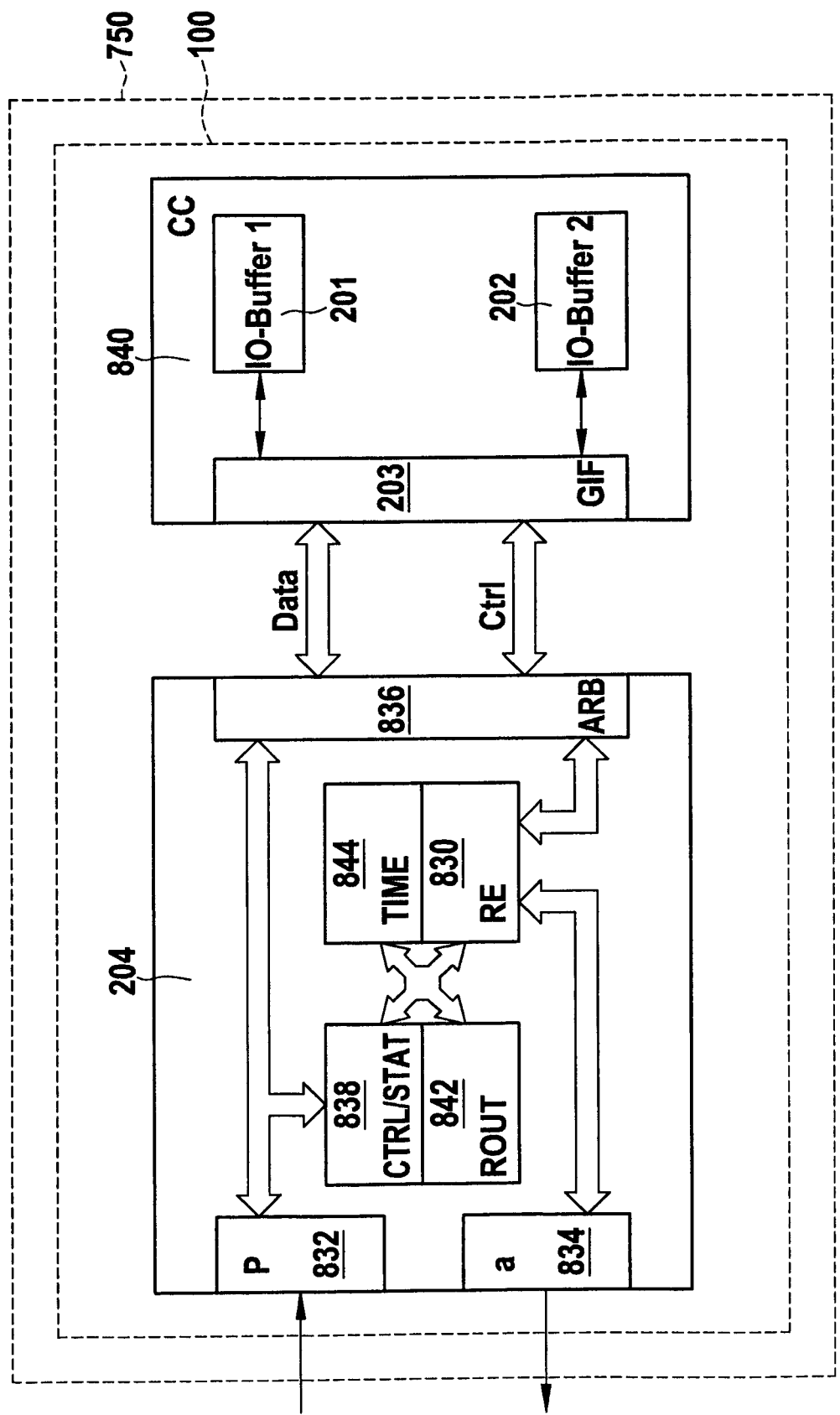
FIG. 16 shows a subscriber interface of the communication controller according to the present invention from FIG. 15.

FIG. 15 shows a block diagram of a communication controller 750 according to the present invention having an active interface "a." Subscriber-specific and/or customer-specific interface 204 is shown in detail in FIG. 16. On the whole, FIG. 16 shows a communication controller 750 according to the present invention, as used in a subscriber 900 according to FIG. 13, for example. FlexRay communication controller 750 includes a FlexRay communication module 100 such as that already explained above in detail. Communication module 100 is subdivided, as stated previously, into a generic part, which is labeled with reference numeral 840 in FIG. 16 and may always be designed the same regardless of connected microcontroller 800, and a customer-specific or subscriber-specific part 204. Generic part 840 is also referred to as the communication controller core. Of generic part 840 of communication module 100, FIG. 16 shows as an example only generic interface 203 (GIF) and buffer memories 201, 202 upstream from message memory 300. Input buffer memory 201 provides temporary storage of messages for transfer to message memory 300. Output buffer memory 202 provides temporary storage of messages for transfer from message memory 300 to microcontroller 800 or to a message memory 300 of another communication controller 750 of subscriber 900. Communication module 100 from FIG. 16 may of course include all or only a few of the elements shown in FIG. 2.

Generic part 840 of communication module 100 is connected to subscriber-specific interface 204 (CIF) of the subscriber-specific part of communication module 100 via generic interface 203 (GIF). Generic interface 203 is connectable to various customer-specific host CPUs 102 via subscriber-specific interface 204. The logic circuit of communication controller 750 is designed in subscriber-specific interface 204 (CIF) in the form of a so-called routing engine 830 (RE). Subscriber-specific interface 204 (CIF) connects peripheral databus 820 of microprocessor 102 to generic interface 203 (GIF) of FlexRay communication controller core 840. In addition, a control and status register 838 in which control and status information is stored and a routing memory 842 in which routing information is stored are also provided. Register 838 and memory 842 may be embodied as certain memory areas of a memory element or as flip-flops.

Passive interface "p" and active interface "a" of communication controller 750 are labeled as 832 and 834, respectively. Passive interface 832 connects communication controller 750 to an active interface "a" of another module (e.g., of microcontroller 800 or of one of communication controllers 750a, 750c to an active interface 834). The passive interface cannot initiate a transfer itself and must therefore always be triggered by another module. The active module is able to access communication controller 750, the control and status information in control and status register 838 and routing information in routing memory 842 via passive interface 832. Passive interface 832 depends on the on-chip peripheral bus 820 used.

Active interface 834 may start the data transfer independently. To do so, it may itself request data from other modules (e.g., from microcontroller 800 or one of communication controllers 750) or write data into other memory areas (e.g., memory element 802 or a message memory 300 of another communication controller 750). It does not matter here whether the counterpart is an active or passive module. Interface 834 is under the sole control of routing engine 830. The structure of active interface 834 is accomplished via control and status register 838 by microprocessor 102 (host CPU). Active interface 834 depends on the on-chip peripheral bus 820 used.

Routing engine 830 includes a state machine that is able to independently trigger the transfer of a message. Triggering of a data transfer is performed in a time-controlled manner, for example, via an integrated timer 844 or by reception of a message or triggering by another module having an active interface "a" (e.g., microprocessor 102 after processing a message). It controls the loading/saving of the message in communication controller 750 as well as the transfer to/from a module. Through appropriate copy and shift operations, routing engine 830 is capable of compiling new messages from parts of existing messages that are or have been stored either in memory element 802 or in a message memory 300 of another communication controller 750.

To control the data transfer, appropriate routing information is written into a memory area 842 at startup by microprocessor 102 (host CPU). With this information, the routing engine is able to trigger a data transfer on receipt of a message or in a time-controlled operation. In addition, other modules may save instructions for processing a message, these instructions then being executed by routing engine 830. Control and status information is included for controlling (de)activating and displaying properties/states.

An arbiter 836 controls competing inquiries for access of microprocessor 102 (via passive interface 832) and routing engine 830 to generic interface 203 (GIF) of communication controller core 840. It is possible to speak of distributed routing here due to the information stored in each active module and implemented logic circuit about independent data transfer because there are no central nodes and there is no communication controller 750 having information about the entire network. Due to the distribution of the routing intelligence among multiple modules of the network, the availability of the subscriber may be improved because the failure of one module does not necessary lead to a collapse of all routing activities in the subscriber.

A so-called crossbar switch interconnection network may be used to increase the data throughput between individual modules. This allows different communication channels to be opened simultaneously. Two or more (depending on the system structure) masters (microprocessor 102 or communication controller 750a, 750c having active interface "a") may establish data transfer to another module (master or slave) and transfer the data. Simultaneous accesses to the same module are prioritized/arbitrated and must be processed sequentially. A running task may be signaled by using flags or semaphores. The possible bandwidth of the total system is thus multiplied. Latency times of microprocessor 102 and jitter in the software tasks interrupted for the duration of the routing are also reduced.

For active copying after receipt of a message, in a time-controlled manner (after a preselected value on timer 844 has elapsed) or after triggering by another communication controller (e.g., communication controller 750c) having active interface "a" or by microprocessor 102 (host CPU), routing engine 830 of a certain communication controller (e.g., communication controller 750a) having active interface "a" independently controls sequential operations to transfer a message from message memory 300a of communication controller 750a to a message memory 300b or 300c of another communication controller 750b or 750c or to memory element 802 of microcontroller 800:

Visualizing the received message object in output buffer memory 202a of communication controller 750a, and Creating a copy of the received message object in input buffer memory 201b or 201c of the other communication controller 750b or 750c or in a configurable address area of memory element 802 assigned to microprocessor 102 using write accesses via active interface 834.

In transfer to a second communication controller 750b or 750c: starting the transfer of the message object out of input buffer memory 201b or 201c into message memory 300b or 300c or second communication controller 750b or 750c.

After receipt of a message, in a time-controlled manner (after a preselected value on timer 844 has elapsed) or after triggering by another communication controller (e.g., controller 750c) having an active interface "a" or by microprocessor 102 (triggering is performed by writing the configuration data such as memory area and data volume, to control register 838), routing engine 830 of a certain communication controller (e.g., communication controller 750a) having active interface "a" independently controls sequential operations to transfer a message from a message memory 300b or 300c of another communication controller 750b or 750c or from memory area 802 of microcontroller 800 into a separate message memory 300a:

Visualizing the data (the message object) in output buffer memory 202b or 202c of the other communication controller 750b or 750c if data is to be transferred from the other communication controller 750b or 750c into communication controller 750a;

Creating a copy of the content of the memory element 802 and/or output buffer memory 202b or 202c of the other communication controller 750b or 750c in a separate input buffer memory 201a by read accesses via active interface "a" into a configured address area, and Initiating the transfer of data from buffer memory 201a into message memory 300a of communication controller 750a and/or communication module 100a.

The following advantages are achieved by using active interface 834 described here, together with the logic circuit in the form of routing engine 830:

Microprocessor 102 is freed of a high interrupt load in comparison with accesses via an external DMA controller (see reference numeral 810 in FIG. 15).

A lower interrupt load allows a lower task jitter and thus better predictability of the overall system.

A greater access bandwidth is possible by accesses to message copies in memory element 802.

Microprocessor 102 has more computation time available for other tasks (latency times of processor 102 are reduced) due to the higher access bandwidth.

What is claimed is:

1. A subscriber of a communication system, comprising:
a microprocessor;
at least two communication controllers; and
a peripheral bus;
wherein the microprocessor is connected to the communication controllers via the peripheral bus, wherein the microprocessor is connected via the communication controllers to at least two communication links of the communication system, wherein messages are transmitted over the communication links, wherein at least one of the communication controllers has: a) an active interface configured to be connected directly to the peripheral bus; and b) a logic circuit configured for independent implementation of a gateway functionality, wherein the gateway functionality is further implemented by performing the following:
performing an active copying of data by the logic circuit of the at least one of the communication controllers to a message memory of another one of the communication controllers, and
wherein the following operations are triggered and controlled independently by the logic circuit of the at least one of the communication controllers for the active copying, as follows:
visualizing the received data in a buffer memory of the at least one of the communication controllers;
creating a copy of the received data in one of a) a configurable address area of a memory element assigned to the microprocessor, or b) a buffer memory of the another one of the communication controllers by write accesses via the active interface; and
starting a transfer of the stored data from the at least one buffer memory into a message memory of the another one of the communication controllers.

2. The subscriber as recited in claim 1, wherein the logic circuit is configured to implement the functionality of a routing engine.

3. The subscriber as recited in claim 2, wherein:
the communication controllers each have a message memory configured for temporary storage of messages a) from the respective communication links assigned to the communication controllers or b) for the respective communication links assigned to the communication controllers; and
the logic circuit coordinates and controls an independent routing of data a) between the message memory of one of the at least two communication controllers and the microprocessor or b) between the message memories of the at least two communication controllers.

4. The subscriber as recited in claim 3, wherein:
at least one of the communication controllers has a communication module which includes a message memory configured for temporary storage of messages a) from the communication link assigned to the at least one of the communication controllers or b) for the communication link assigned to the at least one of the communication controllers; and
the logic circuit coordinates and controls independent routing of data a) between the message memory of one of the at least two communication controllers and the microprocessor, or b) between the message memory of the at least one communication module and the microprocessor, or c) between the message memories of the communication controllers, or d) between the message memories of the communication controllers and the message memory of the at least one communication module.

5. The subscriber as recited in claim 4, wherein:
each communication module includes two buffer memories situated between the message memory and the peripheral bus, the two buffer memories including at least one input buffer memory and at least one output buffer memory; and
the logic circuit coordinates and controls independent routing of data a) between the message memory of one of the at least two communication controllers and the microprocessor, or b) between one of the buffer memories and the microprocessor, or c) between the message memories of the communication controllers, or d) between the message memories of the communication controllers and one of the buffer memories.

6. The subscriber as recited in claim 4, wherein the logic circuit in the communication controller includes a state machine.

7. The subscriber as recited in claim 6, wherein the state machine is hard-wired.

8. The subscriber as recited in claim 6, wherein the communication controllers each have an active interface configured to be connected to the peripheral bus, a logic circuit configured to independently implement a gateway functionality, and an arbiter, and wherein the arbiter arbitrates competing accesses of the microprocessor and the routing engine to: a) a message memory of the communication controller, or b) a message memory of a communication module, or c) at least one of the buffer memories.

9. The subscriber as recited in claim 6, wherein the communication controllers each have an active interface, a logic circuit, and at least one of a control register and a status register, and wherein the microprocessor has access to the at least one of the control register and the status register for at least one of configuration, triggering and monitoring the gateway functionality.

10. The subscriber as recited in claim 6, wherein the communication controllers each have an active interface, a logic circuit, and a routing memory, and wherein the microprocessor has access to the routing memory for at least one of triggering and monitoring the gateway functionality.

11. The subscriber as recited in claim 6, wherein the subscriber is part of a FlexRay communication system in which a data transfer takes place between the subscriber and other FlexRay subscribers connected to a FlexRay communication link in accordance with the FlexRay protocol.

12. The subscriber of claim 1, wherein the starting of the transfer occurs during the creating of a copy of the received data in the buffer memory of the another one of the communication controllers.

13. A communication controller of a subscriber of a communication system, wherein the subscriber includes a microprocessor, the communication controller, and a peripheral bus, comprising:
an active interface; and
a logic circuit;

wherein the active interface directly connects the communication controller to the microprocessor via the peripheral bus, wherein the communication controller is connected to a communication link of the communication system by which messages are transmitted, wherein the logic circuit is configured for independent implementation of a gateway functionality, wherein the gateway functionality is further implemented by performing the following:
    performing an active copying of data by the logic circuit of the at least one of the communication controllers to a message memory of another one of the communication controllers, and
wherein the following operations are triggered and controlled independently by the logic circuit of the at least one of the communication controllers for the active copying, as follows:
    visualizing the received data in a buffer memory of the at least one of the communication controllers;
    creating a copy of the received data in one of a) a configurable address area of a memory element assigned to the microprocessor, or b) a buffer memory of the another one of the communication controllers by write accesses via the active interface; and
    starting a transfer of the stored data from the at least one buffer memory into a message memory of the another one of the communication controllers.

14. The communication controller as recited in claim 13, wherein the communication controller is part of a FlexRay communication system in which a data transfer takes place between the subscriber and other FlexRay subscribers connected to a FlexRay communication link in accordance with the FlexRay protocol.

15. A method for implementing a gateway functionality within a subscriber of a communication system, wherein the subscriber comprises a microprocessor, at least two communication controllers and a peripheral bus, the method comprising:
    connecting the communication controllers to the microprocessor via the peripheral bus;
    connecting the communication controllers to a communication link of the communication system by which messages are transmitted;
    connecting at least one of the communication controllers directly to the peripheral bus via an active interface; and
    implementing the gateway functionality by a logic circuit in the at least one of the communication controllers,
    wherein the gateway functionality is further implemented by performing the following:
        performing an active copying of data by the logic circuit of the at least one of the communication controllers to a message memory of another one of the communication controllers, and
    wherein the following operations are triggered and controlled independently by the logic circuit of the at least one of the communication controllers for the active copying, as follows:
        visualizing the received data in a buffer memory of the at least one of the communication controllers;
        creating a copy of the received data in one of a) a configurable address area of a memory element assigned to the microprocessor, or b) a buffer memory of the another one of the communication controllers by write accesses via the active interface; and
        starting a transfer of the stored data from the at least one buffer memory into a message memory of the another one of the communication controllers.

16. The method as recited in claim 15, wherein implementing the gateway functionality includes triggering and processing interrupts, and wherein the method further comprises:
    fragmenting and defragmenting messages; and
    exchanging messages one of a) among the communication controllers of the subscriber and b) between one of the communication controllers and the microprocessor.

17. The method as recited in claim 15, wherein the microprocessor stores control and status information in a control-and-status register of the at least one of the communication controllers to thereby at least one of configure, control and monitor the gateway functionality.

18. The method as recited in claim 15, wherein the microprocessor stores routing information in a routing memory of the at least one of the communication controllers to thereby at least one of control and monitor the gateway functionality.

19. The method as recited in claim 15, wherein the logic circuit in the at least one of the communication controllers includes a routing engine, whereby competing accesses of the microprocessor and the routing engine to one of a) a message memory of the communication controllers, b) a message memory of a communication module, or c) at least one buffer memory of a message memory of a communication module are arbitrated.

20. A method for implementing a gateway functionality within a subscriber of a communication system, wherein the subscriber comprises a microprocessor, at least two communication controllers and a peripheral bus, the method comprising:
    connecting the communication controllers to the microprocessor via the peripheral bus;
    connecting the communication controllers to a communication link of the communication system by which messages are transmitted;
    connecting at least one of the communication controllers to the peripheral bus via an active interface;
    implementing the gateway functionality by a logic circuit in the at least one of the communication controllers; and
    performing an active copying of data by the logic circuit of the at least one of the communication controllers to a message memory of another one of the communication controllers, wherein the following steps are triggered and controlled independently by the logic circuit of the at least one of the communication controllers for the active copying:
        visualizing the received data in a buffer memory of the at least one of the communication controllers;
        creating a copy of the received data in one of a) a configurable address area of a memory element assigned to the microprocessor, or b) a buffer memory of the another one of the communication controllers by write accesses via the active interface; and
        starting a transfer of the stored data from the at least one buffer memory into a message memory of the another one of the communication controllers, wherein the starting of the transfer occurs during the creating of a copy of the received data in the buffer memory of the another one of the communication controllers;
    wherein the logic circuit in the at least one of the communication controllers includes a routing engine, whereby competing accesses of the microprocessor and the routing engine to one of a) a message memory of the communication controllers, b) a message memory of a communication module, or c) at least one buffer memory of a message memory of a communication module are arbitrated.

21. A method for implementing a gateway functionality within a subscriber of a communication system, wherein the subscriber comprises a microprocessor, at least two communication controllers and a peripheral bus, the method comprising:
- connecting the communication controllers to the microprocessor via the peripheral bus;
- connecting the communication controllers to a communication link of the communication system by which messages are transmitted;
- connecting at least one of the communication controllers to the peripheral bus via an active interface;
- implementing the gateway functionality by a logic circuit in the at least one of the communication controllers; and
- performing an active copying of data by the logic circuit of the at least one of the communication controllers from a message memory of another one of the communication controllers, wherein the following steps are triggered and controlled independently by the logic circuit of the at least one of the communication controllers for the active copying:
  - visualizing the data in a buffer memory of the another one of the communication controllers;
  - creating a copy of the content of one of a) a memory element assigned to the microprocessor, or b) the buffer memory of the another one of the communication controllers, wherein the copy is created in a configurable address area of at least one buffer memory of the at least one of the communication controllers by read accesses via the active interface; and
  - starting a transfer of the stored data from the at least one buffer memory into a message memory of the communication module of the at least one of the communication controllers;

wherein the logic circuit in the at least one of the communication controllers includes a routing engine, whereby competing accesses of the microprocessor and the routing engine to one of a) a message memory of the communication controllers, b) a message memory of a communication module, or c) at least one buffer memory of a message memory of a communication module are arbitrated.

22. The method as recited in claim 20, wherein the method is triggered in a time-controlled manner by one of a) reception of data, b) triggering by the communication controller having the active interface, or c) by triggering by the microprocessor.

23. The method as recited in claim 22, wherein the method is triggered in a time-controlled manner by one of a) reception of data, b) triggering by the communication controller having the active interface, or c) by triggering by the microprocessor.

* * * * *